US008620997B2

(12) United States Patent
Toda

(10) Patent No.: US 8,620,997 B2
(45) Date of Patent: Dec. 31, 2013

(54) CLIENT APPARATUS, COMPUTER SYSTEM, COMPUTER READABLE PROGRAM STORAGE MEDIUM AND DISPLAY METHOD, EACH FOR DETECTING CHANGE OF DISPLAY CONTENTS IN STATUS BAR AREA TO DISPLAY THE CHANGE

(75) Inventor: Naoto Toda, Tokorozawa (JP)

(73) Assignee: Casio Computer Co., Ltd, Tokyo (JP)

( * ) Notice: Subject to any disclaimer, the term of this patent is extended or adjusted under 35 U.S.C. 154(b) by 421 days.

(21) Appl. No.: 12/722,876

(22) Filed: Mar. 12, 2010

(65) Prior Publication Data

US 2010/0250660 A1 Sep. 30, 2010

(30) Foreign Application Priority Data

Mar. 24, 2009 (JP) ................................. 2009-072056

(51) Int. Cl.
*G06F 15/16* (2006.01)
*G06F 3/048* (2013.01)

(52) U.S. Cl.
USPC .......................................... 709/203; 715/772

(58) Field of Classification Search
USPC ................... 709/203; 715/253, 772
See application file for complete search history.

(56) References Cited

U.S. PATENT DOCUMENTS

| | | | |
|---|---|---|---|
| 4,833,535 A | 5/1989 | Ozeki et al. | |
| 5,544,358 A * | 8/1996 | Capps et al. | 715/201 |
| 5,634,052 A | 5/1997 | Morris | |
| 5,673,404 A * | 9/1997 | Cousins et al. | 715/809 |
| 5,818,616 A | 10/1998 | Kawai | |
| 5,848,415 A | 12/1998 | Guck | |
| 6,006,231 A | 12/1999 | Popa | |
| 6,016,478 A | 1/2000 | Zhang et al. | |
| 6,192,393 B1 | 2/2001 | Tarantino et al. | |
| 6,204,846 B1 | 3/2001 | Little et al. | |
| 6,343,313 B1 | 1/2002 | Salesky et al. | |
| 6,363,352 B1 | 3/2002 | Dailey et al. | |
| 6,434,599 B1 | 8/2002 | Porter | |

(Continued)

FOREIGN PATENT DOCUMENTS

| | | |
|---|---|---|
| CN | 1937810 | 3/2007 |
| EP | 0689342 | 12/1995 |

(Continued)

OTHER PUBLICATIONS

Japanese Office Action for 2008-070365 mailed on Mar. 30, 2010.

(Continued)

*Primary Examiner* — Jerry Dennison
(74) *Attorney, Agent, or Firm* — Turocy & Watson, LLP

(57) ABSTRACT

A client apparatus, which requests a service to a server apparatus and receives a result corresponding to the request, comprises: a receiving section for receiving screen data corresponding to the result and a position of a status bar area in the screen data from the server; a display section for performing a display based on the screen data; and a control section for detecting a change of display contents of the screen data based on the position of the status bar area and the screen data, causing the display section to perform the display except for the status bar area based on the screen data when it is not detected that the display content of the status bar area is changed, and causing the display section to display the status bar area when it is detected that the display content of the status bar area is changed.

17 Claims, 12 Drawing Sheets

(56) References Cited

U.S. PATENT DOCUMENTS

| | | | |
|---|---|---|---|
| 6,518,983 B1* | 2/2003 | Grohmann et al. | 715/781 |
| 6,556,217 B1 | 4/2003 | Makipaa et al. | |
| 6,636,888 B1 | 10/2003 | Bookspan et al. | |
| 6,647,360 B2 | 11/2003 | Graham et al. | |
| 6,658,167 B1 | 12/2003 | Lee et al. | |
| 6,661,353 B1 | 12/2003 | Gopen | |
| 6,664,969 B1 | 12/2003 | Emerson et al. | |
| 6,704,024 B2 | 3/2004 | Robotham et al. | |
| 6,710,790 B1 | 3/2004 | Fagioli | |
| 6,725,268 B1* | 4/2004 | Jackel et al. | 709/227 |
| 6,732,103 B1 | 5/2004 | Strick et al. | |
| 6,907,447 B1* | 6/2005 | Cooperman et al. | 709/203 |
| 6,973,457 B1 | 12/2005 | Bastawala et al. | |
| 6,983,331 B1* | 1/2006 | Mitchell et al. | 709/246 |
| 7,200,615 B2 | 4/2007 | Eschbach et al. | |
| 7,277,572 B2 | 10/2007 | MacInnes et al. | |
| 7,346,856 B2 | 3/2008 | Nguyen et al. | |
| 7,502,867 B2* | 3/2009 | Mitchell et al. | 709/246 |
| 7,570,275 B2 | 8/2009 | Idesawa et al. | |
| 7,814,171 B2* | 10/2010 | Blegen et al. | 709/217 |
| 7,844,915 B2 | 11/2010 | Platzer et al. | |
| 7,886,044 B2* | 2/2011 | Maki et al. | 709/224 |
| 7,996,045 B1* | 8/2011 | Bauer et al. | 455/566 |
| 8,072,435 B2* | 12/2011 | Hsieh et al. | 345/173 |
| 2002/0080177 A1 | 6/2002 | Orbanes et al. | |
| 2002/0082811 A1* | 6/2002 | Honjas et al. | 703/2 |
| 2003/0020758 A1 | 1/2003 | Hinderks | |
| 2003/0063043 A1 | 4/2003 | Girard | |
| 2004/0169668 A1 | 9/2004 | Yamada et al. | |
| 2004/0217980 A1 | 11/2004 | Radburn et al. | |
| 2005/0024364 A1 | 2/2005 | Shouen | |
| 2005/0058330 A1 | 3/2005 | Mitsuhashi et al. | |
| 2005/0086259 A1 | 4/2005 | Eschbach et al. | |
| 2005/0091596 A1 | 4/2005 | Anthony et al. | |
| 2005/0102631 A1* | 5/2005 | Andreas et al. | 715/772 |
| 2005/0172221 A1 | 8/2005 | Kobashi et al. | |
| 2005/0187945 A1 | 8/2005 | Ehrich et al. | |
| 2005/0210399 A1 | 9/2005 | Filner et al. | |
| 2005/0259881 A1 | 11/2005 | Goss | |
| 2005/0281482 A1 | 12/2005 | Nishiyama | |
| 2006/0050973 A1 | 3/2006 | Ishikawa | |
| 2006/0110171 A1 | 5/2006 | Miyazawa et al. | |
| 2006/0123121 A1 | 6/2006 | Maegawa et al. | |
| 2006/0174026 A1* | 8/2006 | Robinson et al. | 709/231 |
| 2006/0209094 A1 | 9/2006 | Usuda | |
| 2006/0221097 A1 | 10/2006 | Kagechi et al. | |
| 2007/0005690 A1 | 1/2007 | Corley et al. | |
| 2007/0130251 A1 | 6/2007 | Ohtsuka | |
| 2007/0143803 A1* | 6/2007 | Lim | 725/89 |
| 2007/0150829 A1 | 6/2007 | Eschbach et al. | |
| 2007/0192509 A1 | 8/2007 | Ohtsuka et al. | |
| 2007/0211066 A1 | 9/2007 | Kanda | |
| 2007/0234229 A1 | 10/2007 | Ohtsuka et al. | |
| 2007/0245021 A1 | 10/2007 | Ohtsuka et al. | |
| 2007/0297596 A1 | 12/2007 | Matsubara | |
| 2008/0059569 A1 | 3/2008 | Kanda et al. | |
| 2008/0077660 A1 | 3/2008 | Tomida | |
| 2008/0122847 A1 | 5/2008 | Takano et al. | |
| 2008/0256477 A1* | 10/2008 | Cho et al. | 715/772 |
| 2009/0013210 A1* | 1/2009 | McIntosh et al. | 714/4 |
| 2009/0016641 A1 | 1/2009 | Paladini et al. | |
| 2009/0063972 A1 | 3/2009 | Ma et al. | |
| 2009/0070699 A1* | 3/2009 | Birkill et al. | 715/772 |
| 2009/0094263 A1 | 4/2009 | Shiran et al. | |
| 2009/0241057 A1 | 9/2009 | Toda | |
| 2009/0264157 A1* | 10/2009 | Hsieh et al. | 455/566 |
| 2009/0287736 A1* | 11/2009 | Shike et al. | 707/103 R |
| 2009/0287815 A1* | 11/2009 | Robbins et al. | 709/224 |
| 2009/0327976 A1* | 12/2009 | Williamson et al. | 715/863 |
| 2010/0150522 A1* | 6/2010 | Schmehl | 386/68 |
| 2010/0235732 A1* | 9/2010 | Bergman | 715/702 |
| 2010/0250660 A1* | 9/2010 | Toda | 709/203 |
| 2011/0145750 A1* | 6/2011 | Yodo et al. | 715/772 |
| 2012/0062494 A1* | 3/2012 | Hsieh et al. | 345/173 |

FOREIGN PATENT DOCUMENTS

| | | |
|---|---|---|
| EP | 1450277 | 8/2004 |
| EP | 1503344 | 2/2005 |
| JP | 01-272280 | 10/1989 |
| JP | 2-22987 | 1/1990 |
| JP | 05-284368 | 10/1993 |
| JP | 06-326856 | 11/1994 |
| JP | 08-009168 | 1/1996 |
| JP | 08-116545 | 5/1996 |
| JP | 09-044338 | 2/1997 |
| JP | 10-042221 | 2/1998 |
| JP | 10-074173 | 3/1998 |
| JP | 10-320356 | 12/1998 |
| JP | 10-326232 | 12/1998 |
| JP | 11-331610 | 11/1999 |
| JP | 2001-103491 | 4/2001 |
| JP | 2001-127644 | 5/2001 |
| JP | 2002-024567 | 1/2002 |
| JP | 2002-024862 | 1/2002 |
| JP | 2002-049558 | 2/2002 |
| JP | 2003-050694 | 2/2003 |
| JP | 2003-158534 | 5/2003 |
| JP | 2003-198857 | 7/2003 |
| JP | 2003-271508 | 9/2003 |
| JP | 2004-503862 | 2/2004 |
| JP | 2004-086550 | 3/2004 |
| JP | 2004-171063 | 6/2004 |
| JP | 2004-348380 | 12/2004 |
| JP | 2005-027193 | 1/2005 |
| JP | 2005-128279 | 5/2005 |
| JP | 2005-228227 | 8/2005 |
| JP | 2005-267158 | 9/2005 |
| JP | 2006-031476 | 2/2006 |
| JP | 2007-241710 | 9/2007 |
| WO | 0197014 A2 | 12/2001 |
| WO | 0197014 A3 | 12/2001 |
| WO | 0243365 | 5/2002 |
| WO | 02/079913 | 10/2002 |
| WO | 2005057353 | 6/2005 |

OTHER PUBLICATIONS

Japanese Office Action for 2006-036652 mailed on Apr. 13, 2010.
Office Action for U.S. Appl. No. 11/693,346 mailed on Jun. 3, 2010.
Office Action for U.S. Appl. No. 11/683,763 mailed on Apr. 30, 2010.
Japanese Office Action for Japanese Patent Application No. 2006-036653 mailed on May 31, 2011.
U.S. Office Action for U.S. Appl. No. 11/693,346 mailed on May 18, 2011.
OA dated Jun. 24, 2010 for U.S. Appl. No. 11/844,729, 21 pages.
OA dated Sep. 29, 2010 for U.S. Appl. No. 11/683,763, 21 pages.
OA mailed Dec. 8, 2010 for U.S. Appl. No. 11/693,346, 22 pages.
Written Opinion of PCT/JP2007/054138 dated Jul. 25, 2007.
International Search Report for PCT/JP2007/054138 dated Jul. 25, 2007.
Office Action for U.S. Appl. No. 11/844,729 mailed on Jun. 11, 2009.
Office Action for U.S. Appl. No. 11/844,729 mailed on Nov. 19, 2009.
International Search Report for PCT/JP2007/052902 dated Jan. 25, 2008.
Office Action for U.S. Appl. No. 11/674,514 mailed on Jul. 29, 2009.
Office Action for U.S. Appl. No. 11/674,514 mailed on Mar. 10, 2010.
Written Opinion of PCT/JP2007/057511 dated Jul. 23, 2007.
International Search Report for PCT/JP2007/057511 dated Jul. 23, 2007.
Office Action for U.S. Appl. No. 11/693,346 mailed on Sep. 25, 2009.
Japanese Office Action for 2006-036652 mailed on Jan. 26, 2010.
Japanese Office Action for Japanese Patent Application No. 2006-095744 mailed on Jun. 7, 2011.
Japanese Office Action for Japanese Patent Application No. 2006-091628 mailed on Jun. 7, 2011.

(56) References Cited

OTHER PUBLICATIONS

United States Office Action for U.S. Appl. No. 12/405,417 mailed on Jul. 14, 2011.
Japanese Office Action for Japanese Patent Application No. 2006-063965 mailed on Jun. 6, 2011.
Chinese Office Action for Chinese Application No. 2010101446045 mailed on Feb. 14, 2012.
Chinese Office Action for Chinese Application No. 2010101446045 mailed on Nov. 26, 2012.
Extended European Search Report for European Application No. 10156012.6-2205 dated Apr. 12, 2012.
Office Action for U.S. Appl. No. 11/674,514 mailed on Apr. 25, 2013, 47 pages.
Office Action for U.S. Appl. No. 12/405,417 mailed on Feb. 8, 2013, 43 pages.
Japanese Office Action for Japanese Patent Application No. 2006-36652 mailed on Feb. 14, 2012.
OA dated Apr. 13, 2012 for U.S. Appl. No. 11/683,763, 25 pages.
OA dated Feb. 8, 2012 for U.S. Appl. No. 12/405,417, 39 pages.

\* cited by examiner

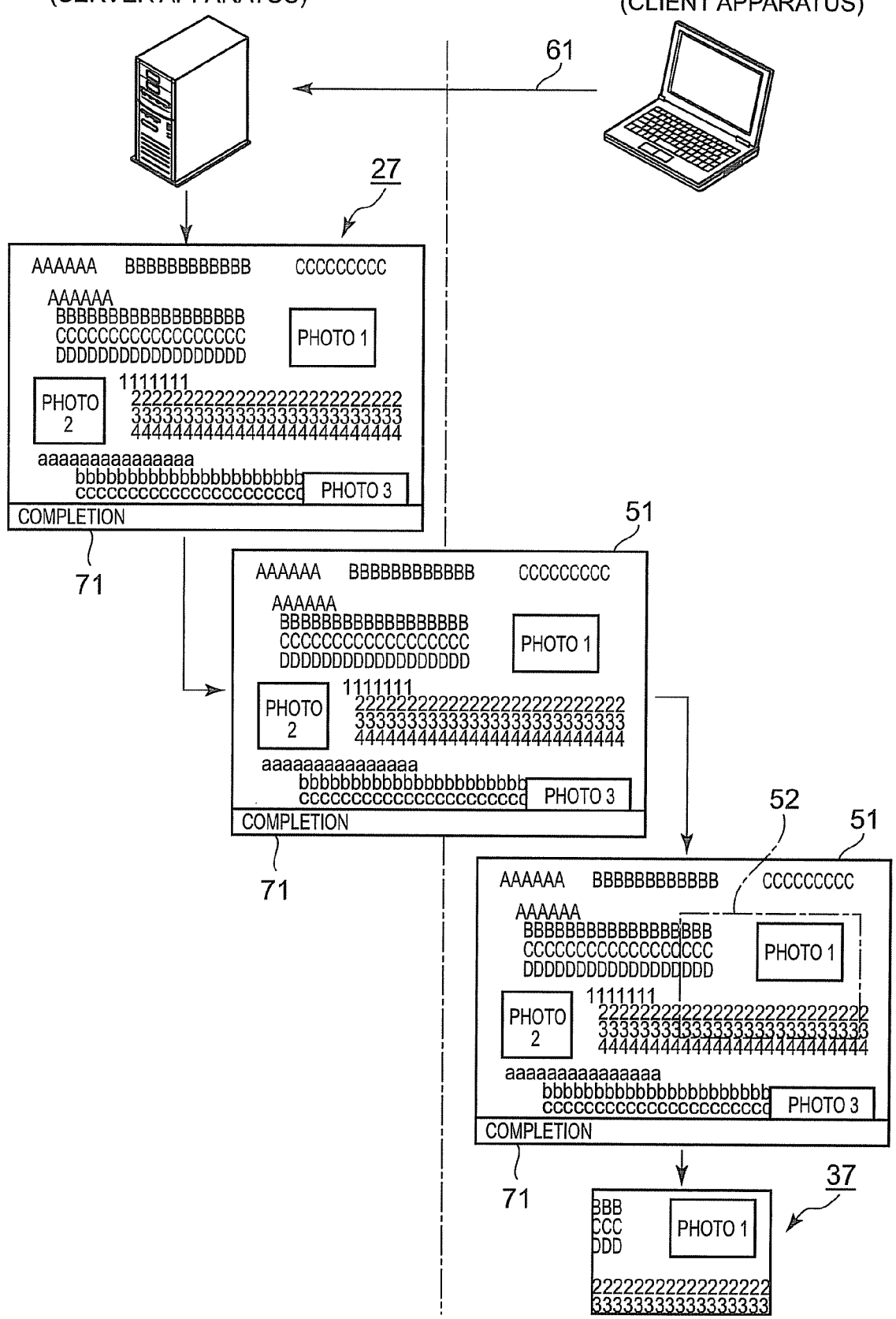

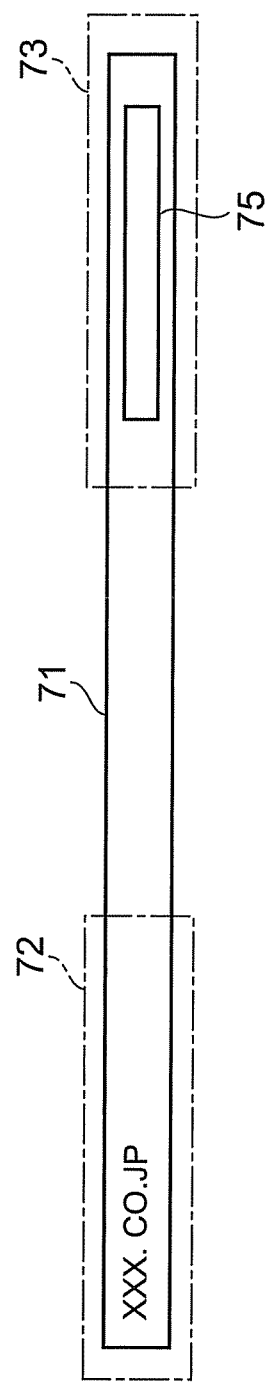
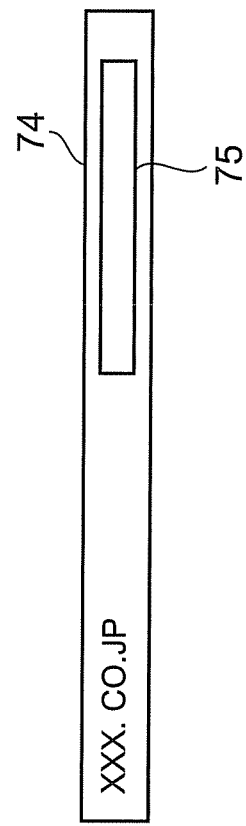
FIG. 6A
FIG. 6B

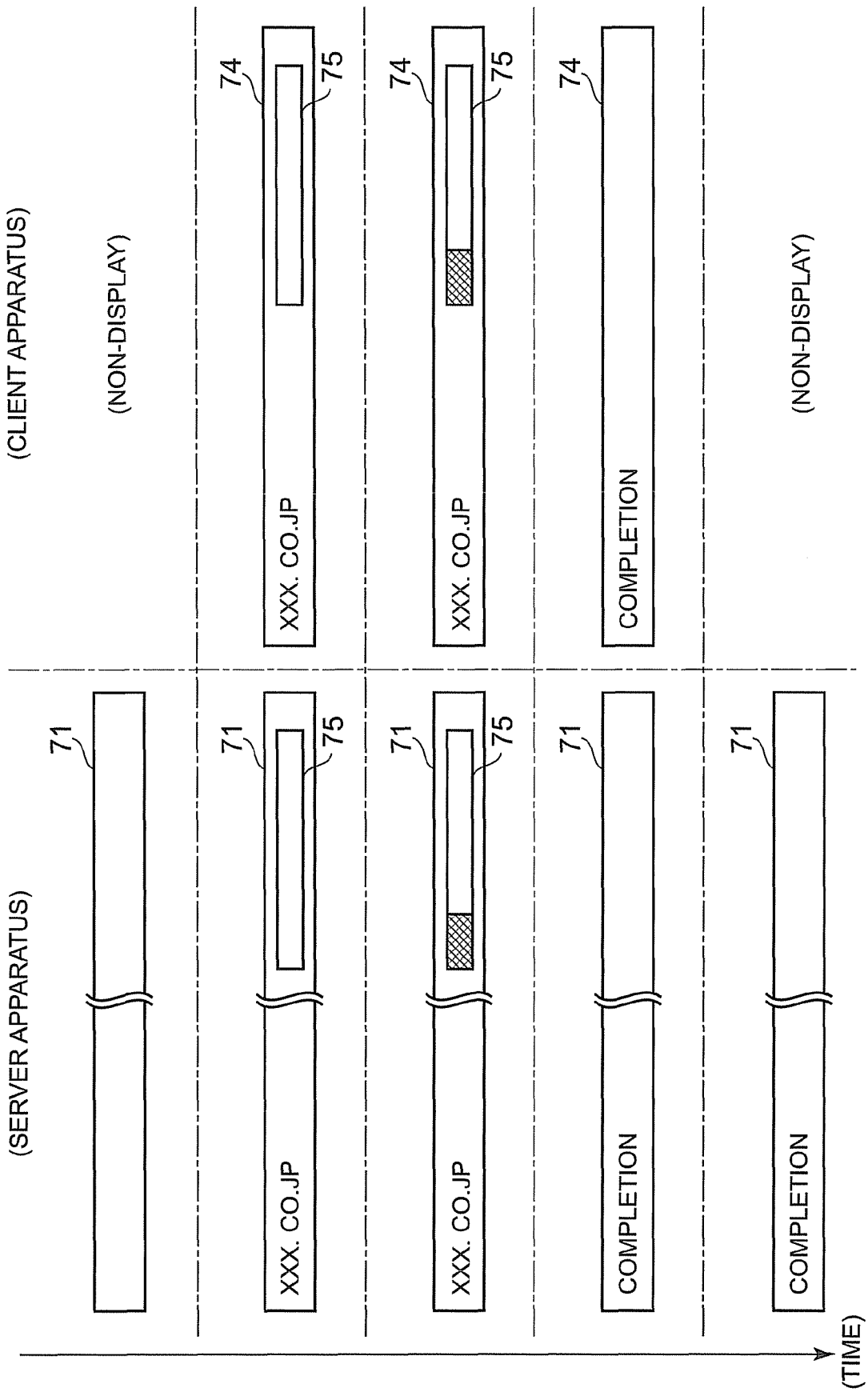

CLIENT APPARATUS, COMPUTER SYSTEM, COMPUTER READABLE PROGRAM STORAGE MEDIUM AND DISPLAY METHOD, EACH FOR DETECTING CHANGE OF DISPLAY CONTENTS IN STATUS BAR AREA TO DISPLAY THE CHANGE

CROSS-REFERENCE TO RELATED APPLICATIONS

This application is based upon and claims the benefit of priority from the prior Japanese Patent Applications No. 2009-072056, filed Mar. 24, 2009, the entire contents both of which are incorporated herein by reference.

BACKGROUND OF THE INVENTION

1. Field of the Invention

The present invention relates to a client apparatus, a computer system, a computer readable program storage medium and a display method for detecting a change of the display contents in a status bar area to display the change.

2. Description of the Related Art

In a computer system realizing Server-Based Computing (SBC), a server apparatus performs an execution process by an application program, and data management; and a client apparatus is connected to the server apparatus to utilize a service based on the process contents of the application program to be executed by the server apparatus.

The server apparatus transmits the screen data corresponding to the display contents of an execution process result of the service requested from the client apparatus to the client apparatus. The client apparatus displays the display contents based on the image data transmitted from the server apparatus on the display device of the client apparatus.

In recent years, the enhancement of the performance and the miniaturization of client apparatuses have progressed. Accompanying these trends, also the display device of each client apparatus has been miniaturized, and consequently it is sometimes impossible or difficult for the display device to display the whole area of the display contents based on the image data transmitted from a server apparatus. As concrete examples, the following cases can be given: the case where the number of pixels capable of being displayed by the display device of a client apparatus is smaller than the number of pixels of the display contents based on image data, the case where viewing the display contents is difficult because the physical size of a display device is small even if the number of pixels thereof is sufficient, and the like.

Accordingly, a method of making the display device of a client apparatus display a part (hereinafter referred to as a "display area") of the display contents based on image data has been devised. In this case, a user of the client apparatus selects a part of the display contents of the image data as the display area. Hereby, it becomes possible for the user to sufficiently ascertain a part of the display contents based on screen data of a server apparatus which part the user wants to ascertain even if the display device is smaller than the display contents based on the image data.

However, there is the case where the display contents of image data cannot be ascertained sufficiently by the method of making the display device of a client apparatus display only a display area.

For example, a part of the display contents based on the image data which part has not been selected by the user (hereinafter the part will be referred to as a "non-display status area") cannot be ascertained from the display contents of the display device of the client apparatus. Consequently, even if a change which is desirable to be ascertained by the user has taken place in the display contents in a non-display status area, the user cannot ascertain the change.

In particular, it sometimes becomes a problem that a change of a status bar produced at the time of the connection of a server apparatus to an external network (such as the Internet) cannot be ascertained by a client apparatus. The reason is that, in the case where the state of the status bar cannot be ascertained, a user cannot know at which time of a time before the establishment of communication of a process accompanied by a network connection, a time in the communication and a time after the completion of the communication the contents are displayed on the display device of the client apparatus, and the user cannot perform the judgment of the timing when the user can ascertain the display contents as a process result of a requested server. Then, the status bar is generally situated at the lower part of a display screen or a window, and is frequently greatly out of a display position of the contents where the ascertainment of the process contents of a service can be performed. Consequently, it is very difficult to include both of the contents capable of performing the ascertainment of the process contents of a service, and a status bar in a display area.

BRIEF SUMMARY OF THE INVENTION

The present invention aims to cope with both of the ascertainment of the screen data indicating the process result contents transmitted from a server apparatus in response to a request of a service from a client apparatus and the ascertainment of a change of a status bar accompanying the communication of the server apparatus.

In accordance with a first aspect of the present invention, a client apparatus, which requests a service to a server apparatus and receives a result corresponding to the request from the server, the client apparatus comprises:

a receiving section for receiving screen data corresponding to the result of the request and a position of a status bar area in the screen data from the server;

a display section for performing a display based on the screen data; and a control section for detecting a change of display contents of the screen data based on the position of the status bar area and the screen data, causing the display section to perform the display except for the status bar area based on the screen data when it is not detected that the display content of the status bar area is changed, and causing the display section to display the status bar area when it is detected that the display content of the status bar area is changed.

In accordance with a second aspect of the present invention, in the client apparatus according to the first aspect, the control section performs non-display of the status bar area displayed on the display section when it is not detected in a predetermined period that the display content of the status bar area is changed.

In accordance with a third aspect of the present invention, in the client apparatus according to the first aspect or the second aspect, the control section causes the display section to display a predetermined area of the status bar area.

In accordance with a fourth aspect of the present invention, in the client apparatus according to the first aspect or the second aspect, the control section causes the display section to display the status bar area when it is detected in a predetermined period that the display content of a predetermined area of the screen data except for the status bar area is changed.

In accordance with a fifth aspect of the present invention, in the client apparatus according to any one of the first aspect to the fourth aspect, the control section causes the display section to display a part of the status bar area the display content of which is changed.

In accordance with a sixth aspect of the present invention, in the client apparatus according to any one of the first aspect to the fifth aspect, the control section causes the display section to display the status bar area in a predetermined position.

In accordance with a seventh aspect of the present invention, in the client apparatus according to the sixth aspect, the control section causes the display section to display the status bar area based on a predetermined layout for the status bar area.

In accordance with an eighth aspect of the present invention, a computer system, comprises:

a client apparatus according to the first aspect; and a server apparatus including:

a storage section for storing the screen data of a display screen of the server apparatus corresponding to the requested service;

a transmission section for obtaining the position of the status bar area in the screen data and transmitting the position of the status bar area; and a screen data transmission section for transmitting the screen data to the client apparatus.

In accordance with a ninth aspect of the present invention, a computer readable program storage medium which stored a program to be executed by a computer of a client apparatus for requesting a service to a server and receiving a result corresponding to the request from the server, the program comprises:

a receiving step for receiving screen data corresponding to the result of the request and a position of the status bar area in the screen data from the server;

a display step for performing a display based on the screen data on a display section; and a control step for detecting a change of display contents of the screen data based on the position of the status bar area and the screen data, performing the display except for the status bar area based on the screen data on the display section when it is not detected that the display content of the status bar area is changed, and displaying the status bar area on the display section when it is detected that the display content of the status bar area is changed.

In accordance with a tenth aspect of the present invention, a display method to be executed by a computer of a client apparatus for requesting a service to a server and receiving a result corresponding to the request from the server, the method comprises:

a receiving step for receiving screen data corresponding to the result of the request and a position of the status bar area in the screen data from the server;

a display step for performing a display based on the screen data on a display section; and a control step for detecting a change of display contents of the screen data based on the position of the status bar area and the screen data, performing the display of except for the status bar area based on the screen data on the display section when it is not detected that the display content of the status bar area is changed, and displaying the status bar area on the display section when it is detected that the display content of the status bar area is changed.

In accordance with an eleventh aspect of the present invention, in the display method according to the tenth aspect, the control step performs non-display of the status bar area displayed on the display section when it is not detected in a predetermined period that the display content of the status bar area is changed.

In accordance with a twelfth aspect of the present invention, in the display method according to the tenth aspect or the eleventh aspect, the control step causes the display section to display a predetermined area of the status bar area.

In accordance with a thirteenth aspect of the present invention, in the display method according to the tenth aspect or the eleventh aspect, the control step causes the display section to display the status bar area when it is detected in a predetermined period that the display content of a predetermined area of the screen data except for the status bar area is changed.

In accordance with a fourteenth aspect of the present invention, in the display method according to any one of the tenth aspect to the thirteenth aspect, the control step causes the display section to display apart of the status bar area the display content of which is changed.

In accordance with a fifteenth aspect of the present invention, in the display method according to any one of the tenth aspect to fourteenth aspect, the control step causes the display section to display the status bar area in a predetermined position.

In accordance with a sixteenth aspect of the present invention, in the display method according to the fifteenth aspect, the control step causes the display section to display the status bar area based on a predetermined layout for the status bar area.

According to the present invention, it becomes possible to deal with both of the ascertainment of the screen data indicating the process result contents transmitted from a server apparatus in response to a request of a service from a client apparatus and the ascertainment of a change of a status bar accompanying the communication of the server apparatus.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is an explanatory drawing showing outline of operation of a computer system.

FIG. 5A is an explanatory drawing schematically showing the transmission of screen data 51a corresponding to the display contents of the whole display area of the display device 27 of the server apparatus 2, and FIG. 5B is an explanatory drawing schematically showing the transmission of screen data 51b corresponding to the display contents of a part in which a change is caused in the display contents on the display device 27 of the server apparatus 2.

FIGS. 6A and 6B show an explanatory drawing showing an example of the predetermined area to be notified as the display contents changed area information of the status bar, and an example of a status bar to be displayed on the display device 37 of the client apparatus 3. FIG. 6A is an explanatory drawing showing an example of the predetermined area to be notified as the display contents changed area information of the status bar, and FIG. 6B is an explanatory drawing showing an example of a status bar to be displayed on the display device 37 of the client apparatus 3.

FIG. 7 is an explanatory drawing showing the relations between changes of the display contents of the status bar of the display device of the server apparatus, and the existence of the display of the status bar on the display device of the client apparatus and changes of the display contents on the status bar.

FIG. 8A is an explanatory drawing showing an example of displaying the status bar at the lower end of the screen of the display device; FIG. 8B is an explanatory drawing showing an example of displaying the status bar at a position not overlapping with a mouse pointer; and FIG. 8C is an explanatory drawing showing an example of the status bar uniting the long side parts of the predetermined areas, in which a change of the display contents of the status bar is produced.

FIG. 13A is an explanatory drawing showing an example of displaying the status bar so as to make one of the long sides of the status bar abut against one of the long sides of the rectangular screen of the display device, and FIG. 13B is an explanatory drawing showing an example of displaying the status bar so as to make one of the long sides of the status bar abut against one of the short sides of the rectangular screen of the display device.

DETAILED DESCRIPTION OF THE INVENTION

Figure 1:
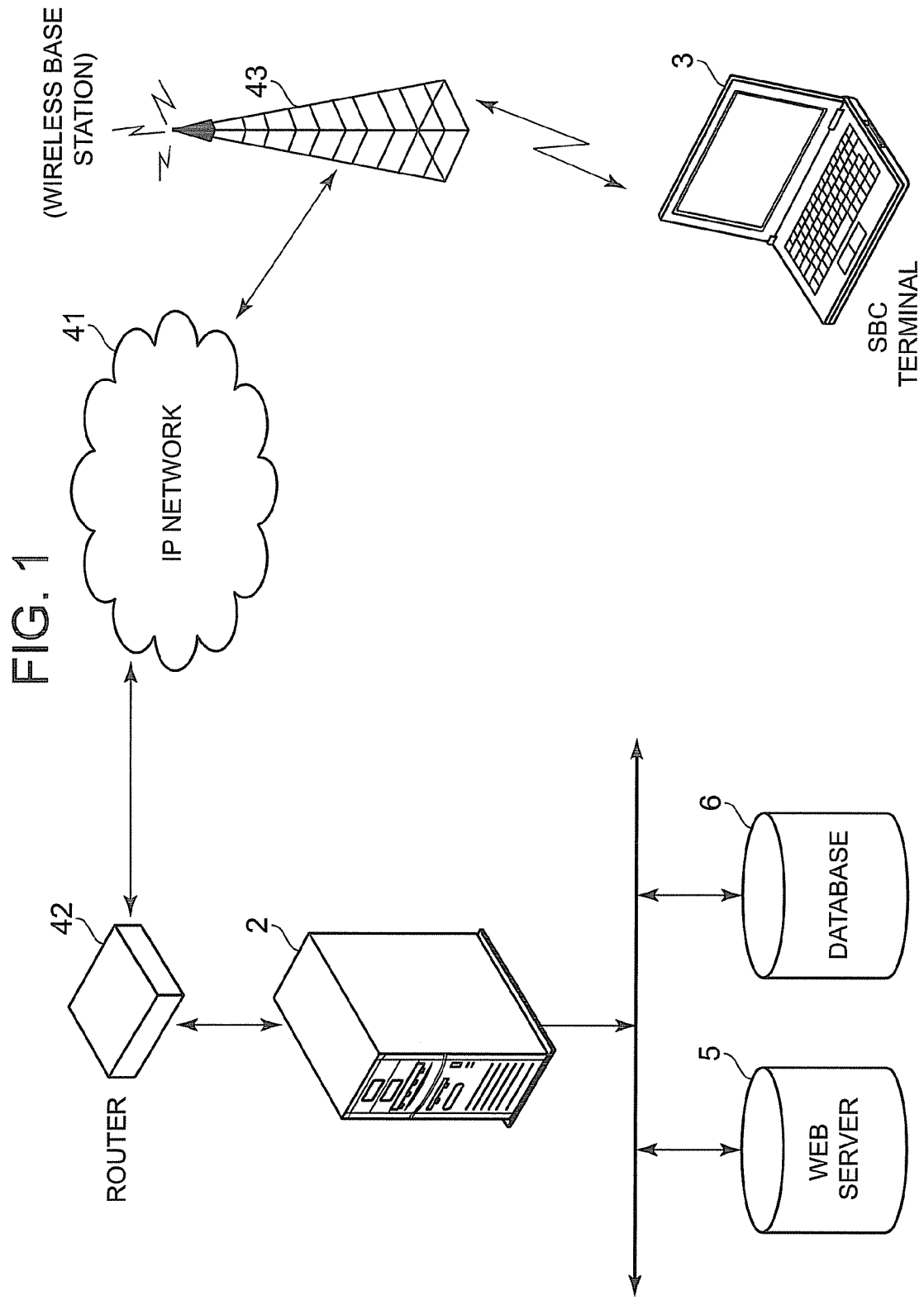
FIG. 1 is a view showing the principal configuration of a computer system according to an embodiment of the present invention.

FIG. 1 is a view showing the principal configuration of a computer system 1 according to an embodiment of the present invention.

The computer system 1 is equipped with a server apparatus 2 and a client apparatus 3. The server apparatus 2 and the client apparatus 3 are connected to each other through a communication line 4 in a state capable of performing mutual communication. The computer system 1 is one realizing SBC by the server apparatus 2 and the client apparatus 3.

Figure 2:
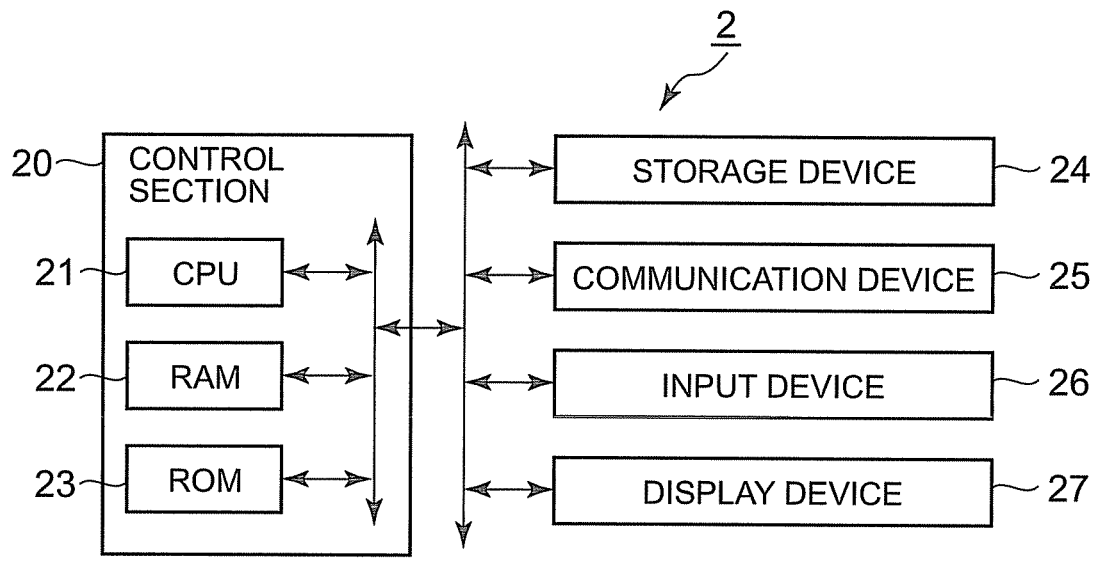
FIG. 2 is a block diagram showing the principal configuration of a server apparatus.

FIG. 2 is a block diagram showing the principal configuration of the server apparatus 2.

The server apparatus 2 is equipped with a control section 20, a storage device 24, a communication device 25, an input device 26 and a display device 27.

The control section 20 is equipped with a central processing unit (CPU) 21, a random access memory (RAM) 22 and a read only memory (ROM) 23. The control section 20 performs processes based on various programs and data and controls the operation of each section of the server apparatus 2.

The CPU 21 reads out various programs and data both stored in the ROM 23 and the storage device 24 to perform their execution processes. An execution result of a program is output as display contents of the display device 27, and besides the execution result is reflected on to the transmission and reception contents of data to a Web server 5 and a database 6, both connected to the server apparatus 2 through the communication device 25.

Moreover, the CPU 21 reads out a program corresponding to a service requested from the client apparatus 3 to perform the execution process thereof, and transmits screen data 51 for making a display device 37 of the client apparatus 3 display the display contents displayed on the display device 27 correspondingly to the process result to the client apparatus 3.

The service to be requested from the client apparatus 3 indicates the whole input operation to the server apparatus 2, which input operations are transmitted from the client apparatus 3 to the server apparatus 2 through the communication line 4. In a system realizing the SBC, it is possible to perform instruction input of making the server apparatus 2 execute a program and read data for utilizing a program, data and the like of the server apparatus 2 by the client apparatus 3, and the service to be requested indicates the whole input operation for the instruction input like this. As an example of the service to be requested, an input instruction for obtaining resources from the Web server 5 through the Web browser of the server apparatus 2 can be given.

The RAM 22 functions as a storage area for storing a program and data both read by the CPU 21, a temporarily parameter produced by a process, and the like.

The ROM 23 stores the program and data both read by the CPU 21, and the like in an unrewritable state.

The storage device 24 is, for example, a hard disk or a flash memory, and stores a program, data and the like that are read by the control section 20 in a rewritable state.

The communication device 25 is, for example, a Network Interface Card (NIC), and connects the server apparatus 2 and the communication line 4 to each other to perform the communication between the server apparatus 2 and the client apparatus 3 through the communication line 4.

The input device 26 is, for example, a keyboard and a mouse, and functions as an interface for performing input to the server apparatus 2.

The display device 27 displays a display screen based on the display contents according to an output of the control section 20. The contents of the screen data 51 are based on the contents of a display screen to be displayed on the display device 27.

Figure 3:
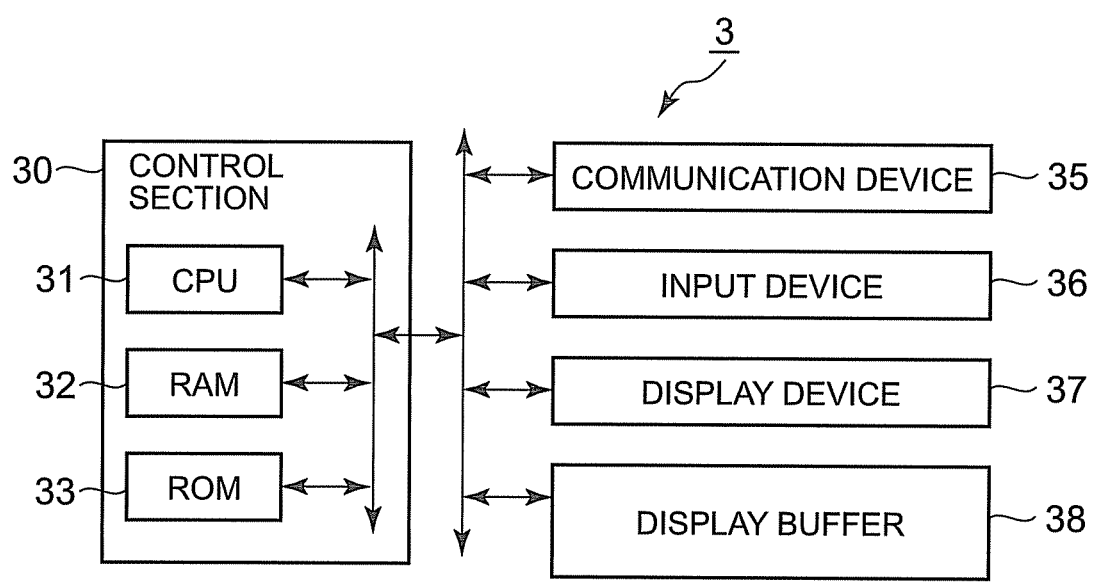
FIG. 3 is a block diagram showing the principal configuration of a client apparatus.

FIG. 3 is a block diagram showing the principal configuration of the client apparatus 3.

The client apparatus 3 is equipped with a control section 30, a communication device 35, an input device 36, the display device 37 and a display buffer 38.

The control section 30 is equipped with a CPU 31, a RAM 32 and a ROM 33. The control section 30 performs the processes based on various programs and data and controls the operation of each section of the client apparatus 3. The control section 30 controls the display contents of the display device 37 as one of the functions of controlling the operations of the respective sections of the client apparatus 3.

The CPU 31 reads out various programs and data that are stored in the ROM 33 to perform the execution processes of the programs and the data.

The CPU 31 performs the control for making the display device 37 display the display contents based on the screen data 51 transmitted from the server apparatus 2. The details of the control will be described later.

The RAM 32 functions as a storage area for storing a program and data that are read by the CPU 31, and a temporal parameter produced by a process.

The ROM 33 stores a program, data and the like which are read by the CPU 31 in an unrewritable state.

The communication device 35 is, for example, a wireless Local Area Network (LAN) card. The communication device 35 connects the client apparatus 3 and the communication line 4 to each other to perform the communication between the server apparatus 2 and the client apparatus 3 through the communication line 4.

The input device 36 is, for example, a keyboard and a touch panel, and functions as an interface for performing input to the client apparatus 3.

The display device 37 displays a display screen based on the display contents according to an output of the control section 30. The display device 37 of the present embodiment has a display screen of a physical size smaller than that of the display device 27 of the server apparatus 2, and the number of pixels of the display device 37 is also smaller than that of the display device 27.

The display buffer 38 stores image data 52 to be displayed on the display device 37. The control section 30 stores the image data 52 of the display contents to be displayed on the display device 37 into the display buffer 38, and thereby controls the display contents of the display device 37.

As shown FIG. 1, the communication line 4 of the present embodiment includes a network 41 constituting an internet protocol (IP) network, a router 42 and a wireless base station 43 in the configuration of the communication line 4, and the communication line 4 connects the server apparatus 2 and the client apparatus 3 to each other in a state capable of performing mutual communication. The router 42 intervenes between the server apparatus 2 and the network 41, and the wireless base station 43 intervenes between the client apparatus 3 and the network 41. The form of the communication line 4 is not limited to the configuration composed of the network 41, the router 42 and the wireless base station 43, but also any configuration may be adopted as long as the configuration can realize the communication between the server apparatus 2 and the client apparatus 3 whether the configuration uses wires or not.

Next, an outline of the operation of the computer system 1 will be described.

FIG. 4 is an explanatory drawing showing the outline of the operation of the computer system 1.

The client apparatus 3 transmits a request 61 of a service to the server apparatus 2. The request 61 of the service is the information input by an operation of a user with the input device 36 of the client apparatus 3. The request 61 is, for example, the information of requesting a process result of a program subjected to an execution process in the server apparatus 2, and the information for performing an instruction input to the program subjected to the execution process in the server apparatus 2.

When the server apparatus 2 receives the request 61 of the service, the server apparatus 2 reads out a program and data according to the contents of the request 61 of the service to perform the execution process of the program and the data, and transmits the screen data 51 for making the display device 37 of the client apparatus 3 display the display contents according to the process result to the client apparatus 3. The execution process of the program and data according to the contents of the request 61 of the service and the control of the transmission of the screen data 51 are performed by the control section 20. The screen data 51 corresponds to the contents to be displayed on the display device 27 of the server apparatus 2, and includes a status bar 71, described below, and the contents indicating a process result corresponding to the request 61 of the service in the display contents of the screen data 51. The screen data 51 is once stored in any of or a plurality of those of the RAM 22, the storage device 24, a not-shown display buffer of the server apparatus 2, and the like, and then the screen data 51 is transmitted to the client apparatus 3.

When the client apparatus 3 receives the screen data 51, the client apparatus 3 makes the RAM 32 store the screen data 51, and displays the display contents based on the screen data 51 on the display device 37. The display control based on the screen data 51 is performed by the control section 30. At this time, as shown in FIG. 4, the control section 30 cuts out the image data 52 for making the display device 37 display the display contents from the image data 51 to generate the image data 52, which display contents are the contents showing the process result corresponding to the request 61 of the service of the display contents based on the screen data 51 and the contents corresponding to an area of a predetermined part, and the control section 30 stored the image data 52 into the display buffer 38.

The area to be cut out as the image data 52, that is, the area to be displayed on the display device 37 on the basis of the screen data 51, is previously set by a user. The setting of the area to be displayed on the display device 37 on the basis of the screen data 51 can be changed by an operation of the user with the input device 36. The areas capable of being selected as the area to be displayed on the display device 37 on the basis of the screen data 51 are all display areas of the display device 27 of the server apparatus 2 except the display area of the status bar 71 (status bar area).

The client apparatus 3 cuts out the data of the part corresponding to the area of a predetermined part of the display contents based on the screen data 51 to copy the cutout data into the display buffer 38 as the image data 52.

Next, the display contents included in the screen data 51 will be described with reference to FIGS. 5A and 5B.

Figures 5A, 5B:
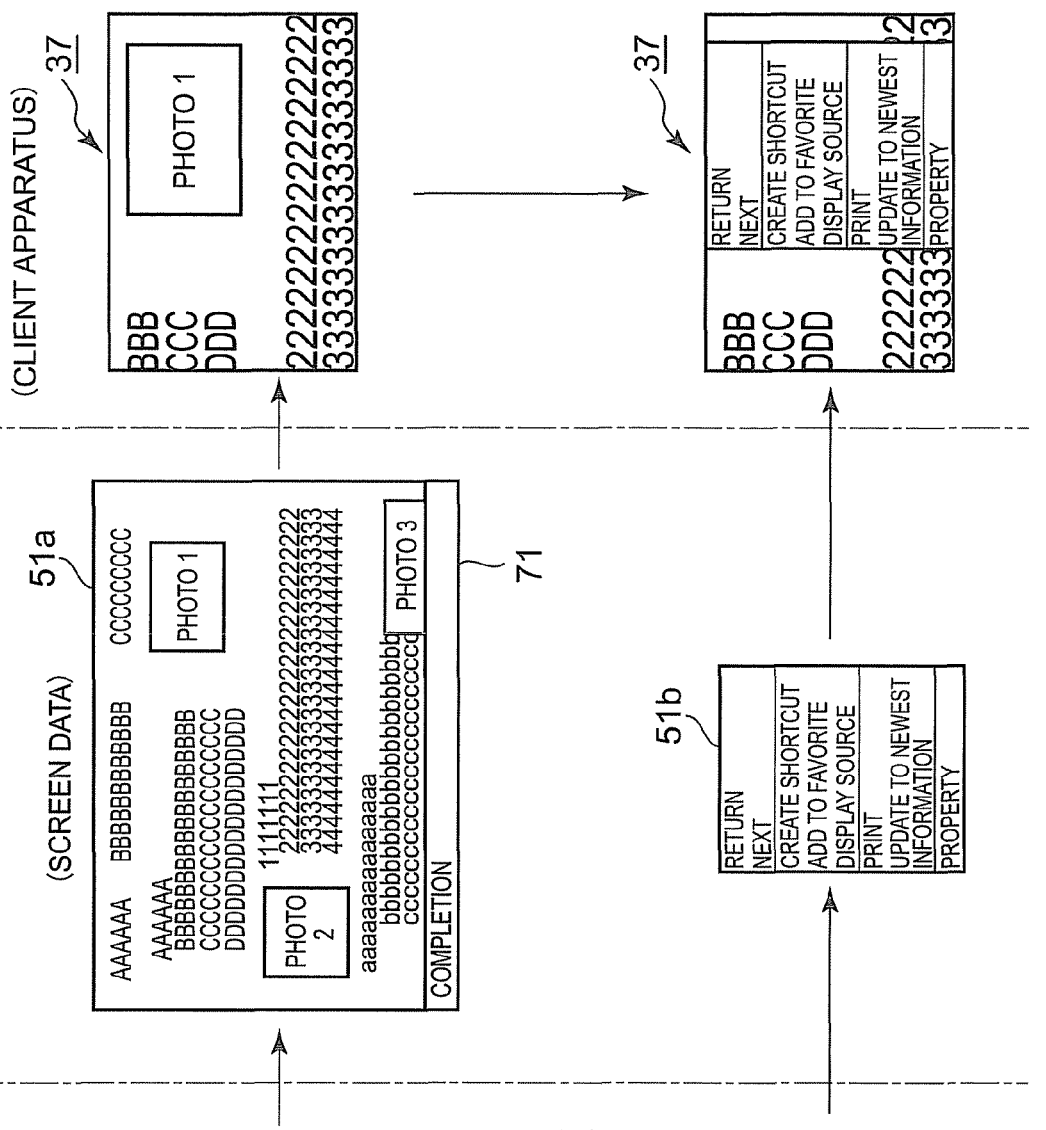
FIGS. 5A and 5B are explanatory drawings schematically showing the changes of the contents of the screen data according to the changes of the display contents on the display apparatus of the server apparatus.

FIGS. 5A and 5B are explanatory drawings schematically showing the changes of the contents of the screen data 51 according to the changes of the display contents on the display apparatus 27 of the server apparatus 2. FIG. 5A is an explanatory drawing schematically showing the transmission of screen data 51a corresponding to the display contents of the whole display area of the display device 27 of the server apparatus 2, and FIG. 5B is an explanatory drawing schematically showing the transmission of screen data 51b corresponding to the display contents of a part in which a change is caused in the display contents on the display device 27 of the server apparatus 2.

The control section 20 of the server apparatus 2 first transmits the screen data 51a corresponding to the display contents in the whole display area of the display device 27 of the server apparatus 2 to the client apparatus 3 as the screen data to be transmitted after receiving the request 61 of a service from the client apparatus 3.

After that, if the control section 20 of the server apparatus 2 has performed a process of causing a change in the display contents on the display device 27, then the control section 20 transmits the screen data 51b corresponding to the display contents of a part in which the change has been produced in the last transmitted screen data to the client apparatus 3. That is, after the control section 20 of the server apparatus 2 has transmitted the screen data 51a corresponding to the display contents of the whole display area of the display device 27 of the server apparatus 2 to the client apparatus 3, the control section 20 transmits the screen data 51b, which is the difference data indicating the part of the display contents in which a change has been caused, to the client apparatus 3 every change of the display contents of the display device 27 accompanying a process.

When the control section 30 of the client apparatus 3 receives the screen data 51a corresponding to the display contents in the whole display area of the display device 27 of the server apparatus 2, the control section 30 makes the display device 37 display the display contents corresponding to the area of a predetermined part.

After that, when the control section 30 of the client apparatus 3 receives the screen data 51b corresponding to the display contents of a part in which a change has been produced in the last received screen data, the control section 30 makes the display device 37 reflect the change of the display contents produced in the area of the predetermined part. After that, the control section 30 makes the display device 37 reflect the change of the display contents caused in the area of the predetermined part every reception of the screen data 51b corresponding to the display contents of the part in which a change has been produced in the last received screen data. That is, the display contents of the display device 37 of the client apparatus 3 are the display contents of a result accumulatively reflecting the screen data 51b corresponding to the display contents of the parts in which changes have been caused in the last received screen data to the image data 51a corresponding to the display contents of the whole display area of the display device 27 of the server apparatus 2 with regard to the display contents corresponding to the area of the predetermined part, and the data corresponding to the display contents of the display device 37 of the client apparatus 3 in the display contents of the result is stored in the RAM 32. The control section 30 performs the overwrite saving of the data of the display contents stored in the RAM 32 with the reflection of a change of the display contents caused by the screen data 51b corresponding to the display contents of the part in which the change has been caused in the last received screen data, and makes the display device 37 display the data.

Incidentally, the screen data 51a and 51b are the expressions for convenience' sake, and both are the data transmitted from the server apparatus 2 as the screen data 51 to be received by the client apparatus 3.

The screen data 51b corresponding to the display contents of the part in which a change has been caused in the last screen data includes display position information indicating at which position the changed part is displayed in the whole display area of the display device 27 of the server apparatus 2. The control section 30 of the client apparatus 3 performs the display control of the display device 37 on the basis of the display position information.

Next, the display of the status bar will be described.

As shown in FIG. 4, the display contents of the display device 27 of the server apparatus 2 include the status bar 71.

The status bar 71 is one configuration of the display contents of application software functioning as a user agent, such as a Web browser, and the status bar 71 displays various communication statuses, such as the state of the communication and the progress thereof, when the server apparatus 2 establishes the communication with the Web server 5 to obtain resources, accompanying the execution process of the service requested through the user agent. That is, the display contents of the status bar 71 changes according to the change of the communication status accompanying the obtainment of the resources to be displayed on the user agent, such as the Web browser.

The control section 20 of the server apparatus 2 notifies the client apparatus 3 of the display contents changed area information indicating the area in which the display contents of the status bar 71 change. The control section 30 of the client apparatus 3 makes the RAM 32 store the display contents changed area information of the status bar 71 notified by the server apparatus 2, and detects a change of the display contents in the status bar 71 included in the screen data 51 on the basis of the display contents changed area information and the screen data 51.

FIG. 6A is an explanatory drawing showing an example of the predetermined area to be notified as the display contents changed area information of the status bar 71, and FIG. 6B is an explanatory drawing showing an example of a status bar 74 to be displayed on the display device 37 of the client apparatus 3.

As shown in FIG. 6A, the control section 20 of the server apparatus 2 notifies the client apparatus 3 of the display positions of predetermined areas 72 and 73 of the status bar 71, in which the changes of display contents are caused according to a change of a communication status accompanying the obtainment of resources as the display contents changed area information of the status bar 71.

As shown in FIG. 6B, the control section 30 of the client apparatus 3 makes the display device 37 of the client apparatus 3 display the status bar 74 produced by cutting out and uniting the predetermined areas 72 and 73 of the status bar 71, in which display contents are changed according to a change of the communication status accompanying the obtainment of resources.

The control section 30 of the client apparatus 3 detects a change of the display contents in the predetermined areas 72 and 73 of the status bar 71 included in the display contents of the screen data 51, in which areas 72 and 73 the change of the display contents is produced correspondingly to a change of the communication status accompanying the obtainment of the resources. When the control section 30 detects the change, the control section 30 makes the display device 37 of the client apparatus 3 display the status bar 74.

Then, if the control section 30 of the client apparatus 3 has not detected any changes of the display contents of the predetermined areas 72 and 73 of the status bar 71, in which the changes of the display contents are produced according to the change of the communication status accompanying the obtainment of resources, even when a predetermined period has passed after the display of the status bar 74, then the control section 30 sets the status bar 74 as the non-display status thereof. That is, the control section 30 deletes the status bar 74, which has been displayed on the display device 37 until then.

FIG. 7 is an explanatory drawing showing the relations between changes of the display contents of the status bar 71 of the display device 27 of the server apparatus 2, and the existence of the display of the status bar 74 on the display device 37 of the client apparatus 3 and changes of the display contents on the status bar 74. Incidentally, the term "communication" in the following description regarding FIG. 7 indicates the communication to be preformed between the server apparatus 2 and the Web server 5 accompanying the execution process of application software functioning as a user agent, such as a Web browser.

In the following, FIG. 7 will be described.

The status bar 71 does not display any information before a start of communication, and the status bar 74 is not displayed on the display device 37 of the client apparatus 3.

After starting communication, the display of the information indicating a connection destination (for example, a character train of "xxx.co.jp" shown in FIG. 7) and the display of a gage 75 showing the progress of obtainment of resources are performed in the status bar 71. During communication, the display contents of the gage 75 are updated accompanying the progress of the obtainment of the resources. After the completion of the obtainment of the resources, the display of the information indicating the completion of the obtainment of the resources (for example, the character train of "completion" shown in FIG. 7) is performed on the status bar 71, and the display of the gage 75, which has been displayed during the communication, is stopped.

The control section 30 of the client apparatus 3 detects a change of the display contents of the predetermined areas 72 and 73 of the status bar 71, in which areas 72 and 73 a change of the display contents is produced correspondingly to a change of the communication status accompanying the obtainment of resources, and the control section 30 makes the display device 37 display the status bar 74 reflecting the change of the display contents similar to those in the predetermined areas 72 and 73. If a change is produced in the display contents of the predetermined areas 72 and 73, then the control section 30 updates the display contents of the status bar 74.

On the other hand, if no changes have been detected in the display contents of the status bar 71 even if a predetermined period has passed, in such a case where no new resources have been obtained after the completion of the obtainment of resources, then the control section 30 of the client apparatus 3 makes the status bar 74 the non-display status thereof.

This control of the display/non-display status of the status bar 74 makes it possible to display the status bar 74 on the display device 37 of the client apparatus 3 only when a change of the display contents of the status bar 71 is caused, and the user's trouble of ascertaining the display area including the status bar 71 every time for ascertaining a change of the display contents of the status bar 71 can be omitted. Besides, because the status bar 74 is made to be in the non-display status thereof when no changes are caused in the display contents of the status bar 71, a wider area of the screen of the display device 37 of the client apparatus 3 can be used for the ascertainment of the display contents corresponding to the area of a part of the display contents based on the screen data 51, which part has been previously determined by user's setting, and consequently the area of the screen of the display device 37 of the client apparatus 3 can be effectively utilized.

The control section 30 sets a timer for performing the time check of the past time from the time when the display contents of the status bar 71 have started the state of being not changed. The timer is set at the timing of the performance of a display of the status bar 74. After that, when the update of the display contents of the status bar 74 is performed, the timer is reset. When the control section 30 judges that a predetermined period has passed on the basis of the time check with the timer, the control section 30 makes the status bar 74 the non-display status thereof.

With that, the description concerning FIG. 7 is finished.

Figure 8A:
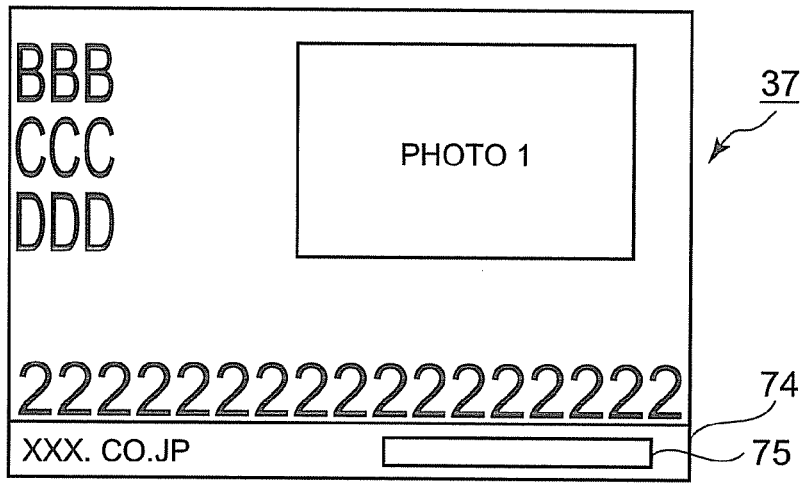
FIGS. 8A, 8B and 8C are explanatory drawings showing display examples of the status bar displayed on the display device of the client apparatus.
Figure 8B:
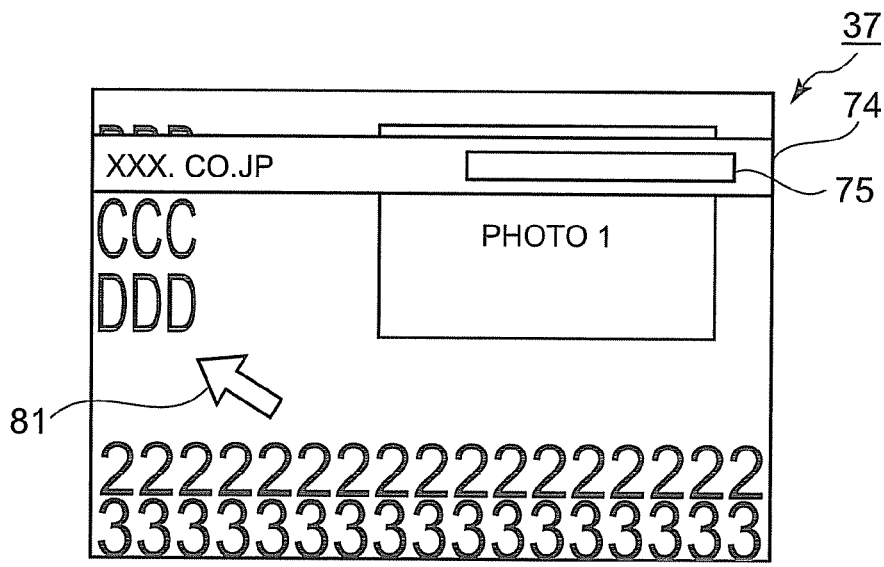
Figure 8C:
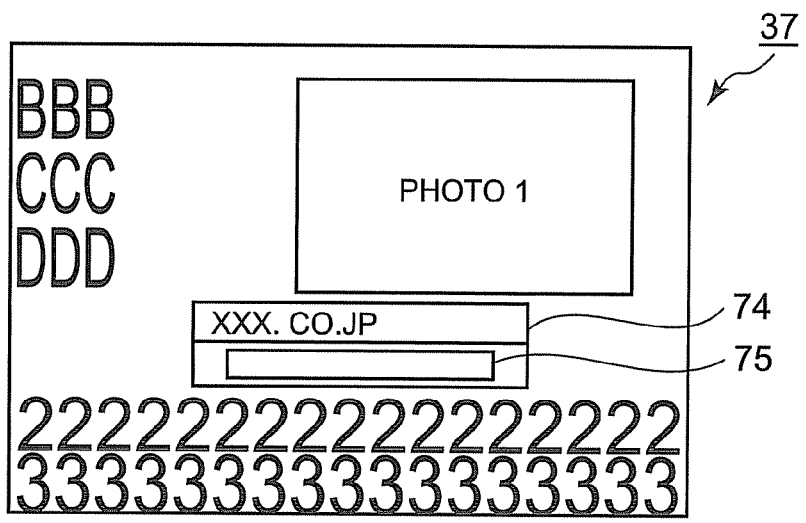

FIGS. 8A, 8B and 8C are explanatory drawings showing display examples of the status bar 74 displayed on the display device 37 of the client apparatus 3. FIG. 8A is an explanatory drawing showing an example of displaying the status bar 74 at the lower end of the screen of the display device 37; FIG. 8B is an explanatory drawing showing an example of displaying the status bar 74 at a position not overlapping with a mouse pointer 81; and FIG. 8C is an explanatory drawing showing an example of the status bar 74 uniting the long side parts of the predetermined areas 72 and 73, in which a change of the display contents of the status bar 71 is produced.

The display position of the status bar 74 and the method of uniting the predetermined areas 72 and 73 of the status bar 71 in the display of the status bar 74, in which areas 72 and 73 a change of display contents is produced, that is, the display layout of the status bar 74, can be set arbitrarily. For example, as shown in FIG. 8A, the status bar 74 may be displayed at the lower end of the screen of the display device 37; as shown in FIG. 8B, the status bar 74 may be displayed at a position not overlapping with the mouse pointer 81; and as shown in FIG. 8C, the status bar 74 uniting the long side parts of the predetermined areas 72 and 73 of the status bar 71, in which areas 72 and 73 a change of display contents is produced, may be displayed. A display position of the status bar 74 other than the positions shown in FIGS. 8A-8C and a method of uniting the predetermined areas 72 and 73 of the status bar 71 other than the method shown in FIG. 8C, in which areas 72 and 73 a change of display contents is produced, may be adopted.

The control section 30 performs the setup of the display position of the status bar 74 and the display layout thereof on the basis of a user's input operation with the input device 36.

Furthermore, the display position of the status bar 74, the display layout thereof, or both of them may be suitably changed according to the display contents of the display device 37. For example, the following display method can be adopted: if the position of the mouse pointer 81 does not overlap with the display bar 74 displayed at the lower end of the screen of the display device 37, the status bar 74 is displayed at the lower end of the screen of the display device 37 as shown in FIG. 8A; and if the status bar 74 overlaps with the position of the mouse pointer 81 when the status bar 74 is displayed at the lower end of the screen of the display device 37, the status bar 74 is displayed at a position not overlapping with the mouse pointer 81 as shown in FIG. 8B.

This control of the display position of the status bar 74 and the display layout thereof makes it possible to further decrease the possibility of preventing the ascertainment of the area of a predetermined part in the display contents of the screen data 51, which part is set by a user on the basis of the display of the status bar 74.

Furthermore, the user's setup of the display position of the status bar 74 and the display layout thereof may be set to be capable of being preserved. For example, a rewritable storage device may further be provided to the configuration of the client apparatus 3, and the setup information of either of the display position and the display layout of the status bar 74, which is determined by a user, or both of them may be stored in the storage device. Then, after the setting thereof, the control section 30 reads out the setup information stored in the storage device to control the display position and the display layout of the status bar 74.

In place of providing the storage device furthermore, the ROM 33 of the control section 30 may be replaced with a rewritable storage device, such as a flash memory, to store the setup information into the rewritable storage device. Additionally, the setup information may be made to be stored in the RAM 32 of the control section 30 as a temporal setup until the finish of the operation of the client apparatus 3.

This preservation of the setup of the display position and the display layout of the status bar 74 makes it possible for a user to make the client apparatus 3 display a display of the status bar 74 based on the display position and the display layout thereof according to the user's own setup, and the convenience of the ascertainment of the display contents of the status bar 74 is greatly improved.

Next, a flow of the process performed by the computer system 1 will be described with reference to the flow charts of FIGS. 9, 10 and 11.

Figure 9:
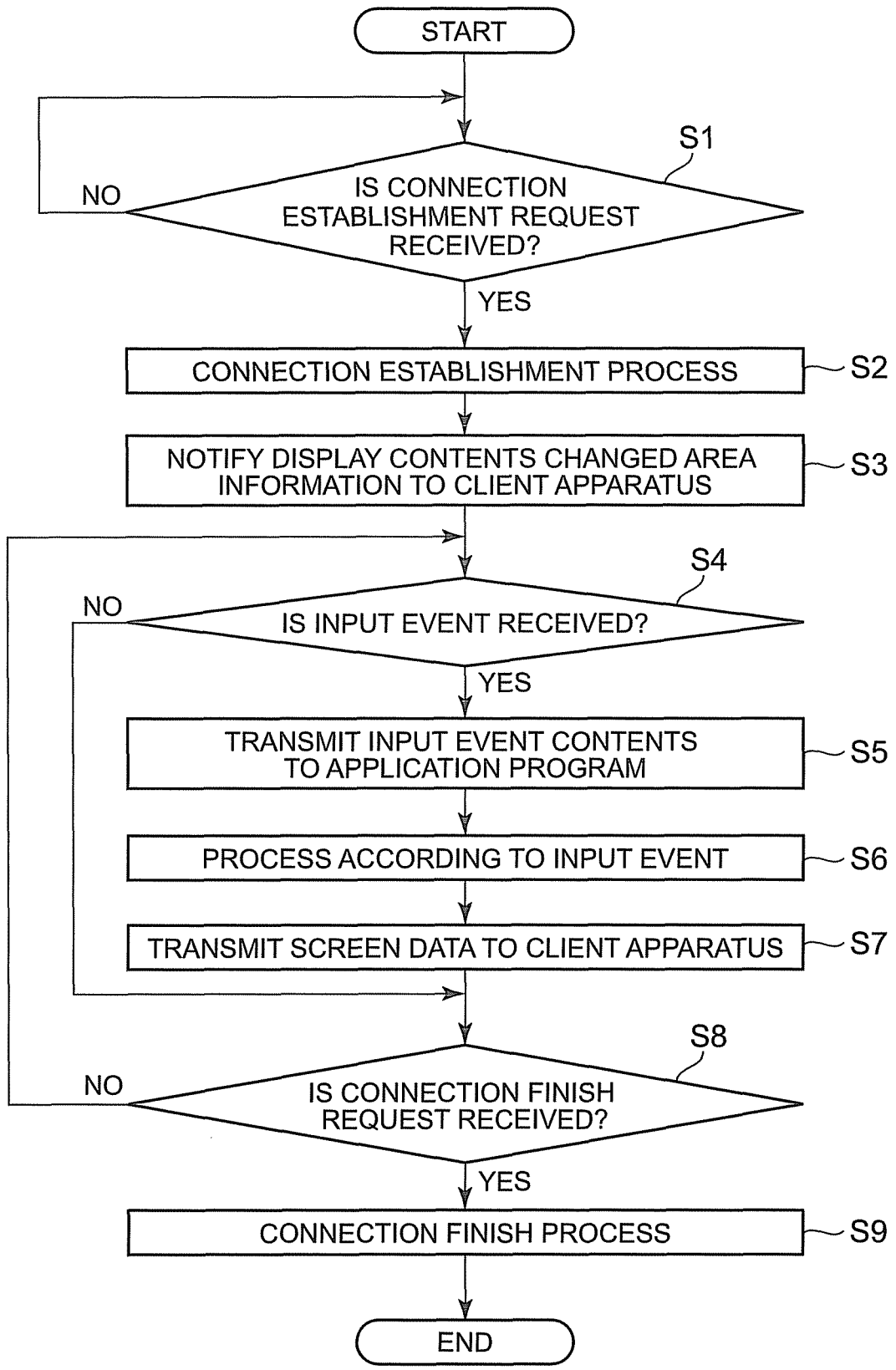
FIG. 9 is a flowchart showing the flow of a process of the service of the server apparatus to be performed to the client apparatus.

FIG. 9 is a flowchart showing the flow of a process of the service of the server apparatus to be performed to the client apparatus 3.

First, the control section 20 of the server apparatus 2 judges whether the control section 20 has received a process request (connection establishment request) for establishing the connection between the server apparatus 2 and the client apparatus 3 from the client apparatus 3 or not (Step S1). The control section 20 is in a standby state of repeating the judgment at Step S1 until the control section 20 receives a connection establishment request from the client apparatus 3 (Step S1: NO).

When the control apparatus 20 receives a connection establishment request from the client apparatus 3 (Step S1: YES), the control section 20 performs a process of establishing the connection between the server apparatus 2 and the client apparatus (connection establishment process) (Step S2). The process at Step S2 is performed in cooperation with the control section 30 of the client apparatus 3.

After the process at Step S2, the control section 20 notifies the client apparatus 3 of the display positions of the predetermined areas 72 and 73 in the status bar 71, at which areas 72 and 73 a change of display contents is caused correspondingly to a change of a communication state accompanying the obtainment of resources, as display contents changed area information of the status bar 71 (Step S3).

After the process at Step S3, the server apparatus 2 judges whether the server apparatus 2 has received an input event from the client apparatus 3 or not (Step S4). If the server apparatus 2 has received the input event from the client apparatus 3 (Step S4: YES), then the control section 20 transmits the input contents based on the input event to the application program of the object of the input event (Step S5), and performs the process according to the input event (Step S6). Then, the control section 20 transmits the screen data 51 based on a change produced in the display contents of the display device 27 of the server apparatus 2 by the process at Step S6 to the client apparatus 3 (Step S7).

After the process at Step S7 or if the server apparatus 2 has not received any input events from the client apparatus 3 at Step S4 (Step S4: NO), the control section 20 judges whether the control section 20 has received a process request (connection finish request) for finishing the connection between the server apparatus 2 and the client apparatus 3 from the client apparatus 3 or not (Step S8). When the control section 20 has received the connection request from the client apparatus 3 (Step S8: YES), the control section 20 performs a process of finishing the connection between the server apparatus 2 and the client apparatus 3 (connection finish process) (Step S9), and finishes the service. If the control section 20 has not received any connection finish requests from the client apparatus 3 at Step S8 (Step S8: NO), the control section 20 returns the process to the judgment at Step S4.

Figure 10:
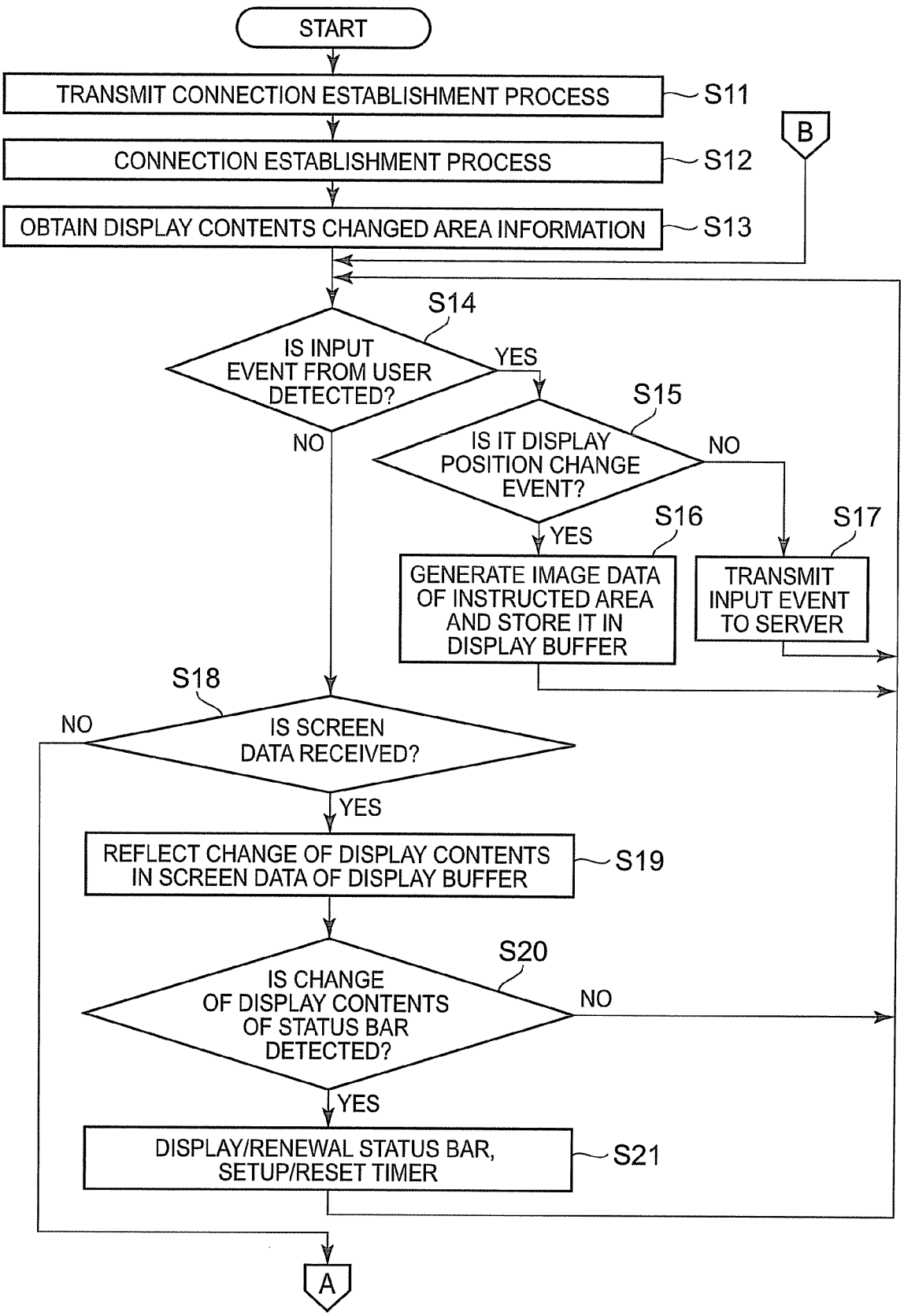
FIG. 10 is a flow chart showing the flow of the process from Step S11 to Step S21 in the process of the client apparatus of performing a request of a server to the server apparatus and receiving the result of the service.

FIG. 10 is a flow chart showing the flow of the process from Step S11 to Step S21 in the process of the client apparatus 3 of performing a request of a server to the server apparatus 2 and receiving the result of the service.

Figure 11:
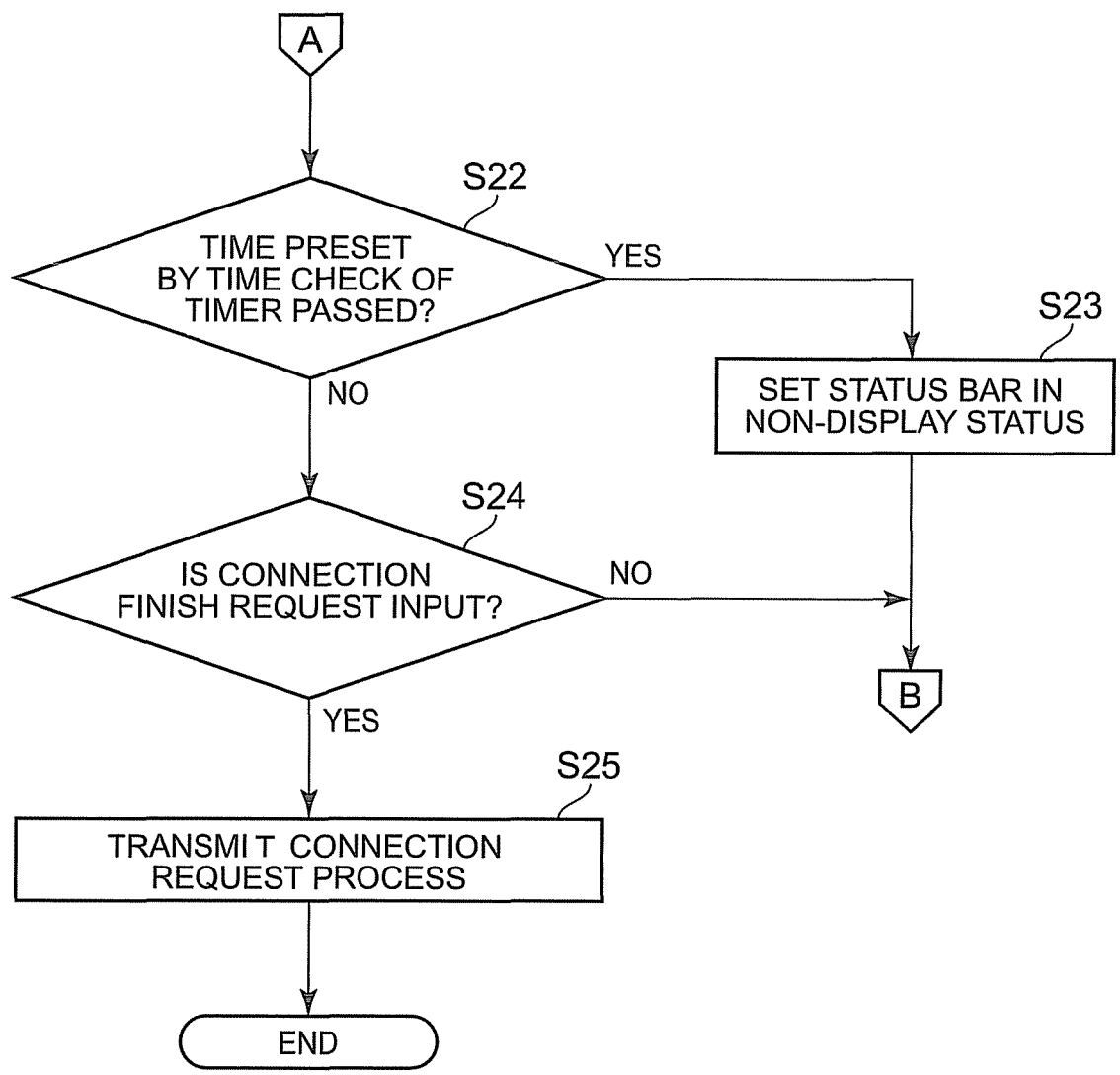
FIG. 11 is a flow chart showing the flow of the process from Step S22 to Step S25 in the process of the cline apparatus of performing a request of a service to the server apparatus and receiving the result of the service.

FIG. 11 is a flow chart showing the flow of the process from Step S22 to Step S25 in the process of the cline apparatus 3 of performing a request of a service to the server apparatus 2 and receiving the result of the service.

First, the control section 30 of the client apparatus 3 transmits a connection establishment request to the server apparatus 2 on the basis of a user's input performed with the input device 36 (Step S11), and performs the connection establishment process in cooperation with the control section 20 of the server apparatus 2 (Step S12). After Step S12, the control section 30 receives and obtains the display contents changed area information of the status bar 71 transmitted from the server apparatus 2 (Step S13).

After Step S13, the control section 30 judges whether the control section 30 has detected an input event (Step S14). The input event reception is the detection of an input operation of a user performed with the input device 36.

If the control section 30 has detected an input event (Step S14: YES), the control section 30 judges whether the detected input event is a display position change event or not (Step S15). The display position change event is an input operation for changing the position of an area in which the control section 30 makes the display device 37 of the client apparatus 3 display in the display contents based on the screen data 51. If the detected input event is the display position change event (Step S15: YES), the control section 30 cuts out and generates the image data 52 corresponding to the area designated by the display position change event from the screen data 51, and stores the image data 52 into the display buffer 38 (Step S16). Because the status bar 74 is displayed as the occasion demands, the designated area may be set as the area excluding the status bar 74 at this time. If the detected event is not the display position change event at Step S15 (Step S15: NO), the control section 30 regards the detected event as an input of a service request to the server apparatus 2, and transmits the information indicating the contents of the input event to the server apparatus 2 (Step S17).

After the process at Step S16 or Step S17, the control section 30 returns the process to the judgment at Step S14.

If the control section 30 has not detected any input event at Step S14 (Step S14: NO), the control section 30 judges whether the control section 30 has received the screen data 51 from the server apparatus 2 or not (Step S18). When the control section 30 has received the screen data 51 from the server apparatus (Step S18: YES), the control section 30 reflects a change in the area of a predetermined part of the display contents based on the screen data 51 on the screen data of the display buffer 38 (Step S19). Then, the control section 30 judges whether the control section 30 has detected a change of the display contents of the predetermined areas 72 and 73 of the status bar 71 in which areas 72 and 73 a change of the display contents is produced according to a change of a communication status accompanying the obtainment of resources (Step S20). If the control section 30 has detected a change of the display contents of the predetermined areas 72 and 73 (Step S20: YES), the control section 30 makes the display device 37 display the status bar 74, and sets a timer (Step S21). If the display of the status bar 74 has already been performed at the process at Step S21, the control section 30 updates the display of the status bar 74, and rests the timer. After the process at Step S21 or if the control section 30 has not detected any changes of the display contents of the predetermined areas 72 and 73 of the status bar 71, in which areas 72 and 73 a change of display contents is callused according to a change of the communication status accompanying the obtainment of resources, at Step S20 (Step S20: NO), then the control section 30 returns the process to that at Step S14.

If the control section has not received the screen data 51 from the server apparatus 2 at Step S18 (Step S18: NO), the control section 30 judges whether a predetermined period has passed or not on the basis of the time check with the timer (Step S22). If the control section 30 judges that the predetermined period has passed (Step S22: YES), the control section 30 makes the status bar 74 the non-display status thereof (Step S23). If the control section 30 judges that the predetermined period has not passed yet at Step S22 or the timer is not set (Step S22: NO), the control section 30 judges whether an input for finishing the connection of the server apparatus 2 and the client apparatus 3 has been performed by a user with the input device 36 or not, that is, whether an input of a connection finish request has been performed or not (Step S24). If the input of the connection finish request has been performed (Step S24: YES), the control section 30 transmits the connection finish request (Step S25), and finishes the process. After the process at Step S23 or if the input of the connection finish request has not been performed at Step S24 (Step S24: NO), the control section 30 returns the process to that at Step S14.

According to the computer system 1 of the present embodiment, when the client apparatus 3 receives the screen data 51 transmitted from the server apparatus 2, the control section 30 of the client apparatus 3 makes the display device 37 display the display contents in the area of a predetermined part in the area of the display contents in the whole display area of the display device 27 of the server apparatus 2 except for the status bar 71 on the basis of the screen data 51. Then, if the control section 30 detects a change of the display contents in the predetermined areas 72 and 73 of the status bar 71 included in the display contents based on the screen data 51, the control section 30 makes the display device 37 display the status bar 74. Thereby, not performing the display of the status bar 74 when no changes have been produced in the display contents of the status bar 71 makes it possible to use the whole display screen of the display device 37 for the display contents in the area of a predetermined part in the area of the display contents of the whole display area of the display device 27 of the server apparatus 2 except for the status bar 71, and the display contents in the area of the part can be ascertained in a good state. And the ascertainment of the screen data 51 indicating the process result contents transmitted from the server apparatus 2 in response to a request of a service from the client apparatus 3 can be performed in a good state. Then, if a change is produced in the display contents of the status bar 71, the status bar 74 is displayed, and consequently the change of the display contents of the status bar 74 can be ascertained in a good state. Furthermore, because it becomes possible to make the display device 37 of the client apparatus 3 display the status bar 74 only when a change of the display contents of the status bar 71 is caused, it is possible for a user to save the trouble of ascertaining the display area including the status bar 71 every time for ascertain a change of the display contents of the status bar 71. That is, both of the ascertainment of the screen data 51 indicating the process result contents transmitted from the server apparatus 2 in response to a request of a service from the client apparatus 3 and the ascertainment of a change of the status bar 71 accompanying the communication of the server apparatus 2 can be made to be coped with.

Furthermore, if the control section 30 does not detect any changes in the display contents of the predetermined areas 72 and 73 during a pass of a predetermined period on the basis of the time check with a timer, the control section 30 deletes the status bar 74, which has been displayed on the display device 37 until then. That is, when the predetermined period has passed from the last change of the display contents of the status bar 71 has been caused, then the status bar 74 is automatically deleted, and it becomes possible to use the whole display screen of the display device 37 for ascertaining the display contents in the area of the predetermined part in the area of the display contents of the whole display screen of the display device 37 except for the status bar 71. Hereby, it can be prevented that the status bar 74, in which no changes are caused in the display contents therein, continues to occupy the display screen of the display device 37 interminably after the ascertainment of a change of the display contents of the status bar 71 by means of the status bar 74 displayed on the display device 37. For this reason, it is possible to better cope with both the ascertainment of the screen data 51 indicating the process result contents transmitted from the server apparatus 2 in response to a request of a service from the client apparatus 3 and the ascertainment of a change of the status bar accompanying the communication of the server apparatus 2.

Furthermore, because the display contents changed area information is the information indicating a position of the predetermined areas 72 and 73 of a part of the status bar 71, at which areas 72 and 73 a change of display contents is caused correspondingly to a change of a communication status accompanying the obtainment of resources, the control section 30 of the client apparatus 3 can well perform the detection of a change of the display contents of the status bar 71 on the basis of the screen data 51 and the display contents changed area information.

Furthermore, the control section 30 makes the display device 37 display the status bar 74, which is the display contents uniting the predetermined areas 72 and 73 of parts of the status bar 71, in which areas 72 and 73 a change of display contents is produced. Hereby, the display areas of the status bar 71 which areas are for displaying parts in which no changes of display contents are caused can be omitted, and the occupation rate of the display area of the status bar 74 to the whole display screen of the display device 37 can be made to be smaller in comparison with that of making the display device 37 of the client apparatus 3 display the whole of the status bar 71. For this reason, it is possible to better cope with both of the ascertainment of the screen data 51 indicating the process result contents transmitted from the server apparatus 2 in response to a request of a service from the client apparatus 3 and the ascertainment of a change of the status bar 71 accompanying the communication of the server apparatus 2.

Furthermore, the control section 30 performs the setting of a method of uniting the predetermined areas 72 and 73 of the status bar 71, in which areas 72 and 73 a change of display contents is caused, on the basis of a user's input operation with the input device 36. Then, a user can display the status bar 74 at an arbitrary position by the adaptation of making it possible to preserve the user's setting of the display position of the status bar 74 in a storage device or the like and the adaptation of reading out the setup information stored in the storage device and controlling the display position of the status bar 74 by the control section 30 after the setting. Hereby, the user can select the display position of the status bar 74 to be a position where the user can easily ascertain the display contents of the status bar 74.

Furthermore, the control section 30 performs the setting of a method of uniting the predetermined areas 72 and 73 of the status bar 71 in the display of the status bar 74, in which areas 72 and 73 a change is caused, on the basis of an input operation of a user with the display contents input device 36. Then, the user can display the status bar 74 in an arbitrary layout by the adaptation of making it possible to preserve the user's setting of the method of uniting the predetermined areas 72 and 73 of the status bar 71, in which areas 72 and 73 a change of display contents is produced, in a storage device or the like, and by the adaptation of reading the setup information stored in the storage device and controlling the display layout of the status bar 74 by the control section 30 after the setting. Hereby, the user can select the display layout of the status bar 74 by which the user can easily perform the ascertainment of the display contents of the status bar 74.

The description of the aforesaid embodiment concerns an example of the present invention, and does not limit the embodiment of the present invention. The changes of the configuration without departing from the scope of the present invention can be made.

For example, the display contents changed area may be on the outside of the area of the status bar 71.

Figure 12:
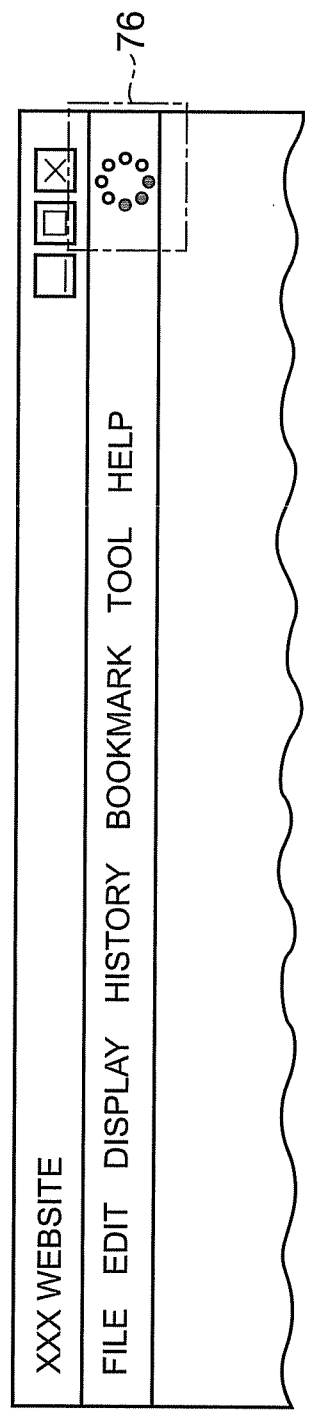
FIG. 12 is a view showing an example of an animation area of a toolbar of a Web browser.

FIG. 12 is a view showing an example of an animation area 76 of a toolbar of a Web browser.

As shown in FIG. 12, some of the pieces of application software functioning as user agents, such as Web browsers, severally include an animation area 76, which is a display part for performing an animation during the communication of the server apparatus 2 which communication is performed with the Web server 5 accompanying the execution process of the application software in a display area situated on the outside of the area of the status bar 71. Because a change of the display contents of the status bar 71 accompanies the communication performed by the server apparatus 2 with the Web server 5, also the display contents of the status bar 71 have frequently changed when the display contents of the animation area 76 have changed. For this reason, the client apparatus 3 may be adapted to display the status bar 74 when the client apparatus 3 detects the display contents of the animation area 76 by using the animation area 76 situated on the outside of the area of the status bar 71 as a display contents changed area.

Situating the display contents changed area on the outside of the area of the status bar 71 makes it possible to use another trigger indicating the possibility of the causability of a change in the display contents of the status bar 71 for detecting the change in the display contents of the status bar 71. For example, a situation in which no changes are produced in the display contents of the status bar 71 even if a predetermined period has passed, such as the case where a delay is caused in a obtainment process of resources owing to some reason when the server apparatus 2 obtains the resources from the Web server 5, can be produced. If this situation is caused, then the status bar 74 is changed to be in the non-display status thereof although the resources are being obtained, and it becomes impossible to perform the ascertainment of the progressing situation of the resource obtainment process from the display contents of the display device 37 of the client apparatus 3. However, because the animation in the animation area 76 is continuing as long as the communication between the server apparatus 2 and the Web server 5 is being performed, it is possible to make the display device 37 of the client apparatus 3 display the status bar 74 as long as the communication between the server apparatus 2 and the Web server 5 for the obtainment process of resources is continuing even if no changes are produced in the display contents of the status bar 71. That is, it is possible to make the display device 37 of the client apparatus 3 display the display contents of the status bar 71 continuously from a start to the end of a change of the display contents of the status bar 71 having the continuity as a process.

The display position of the status bar 74 may be adapted to be changed according to the change of the position angle of the display device 37 of the client apparatus 3.

Figure 13A:
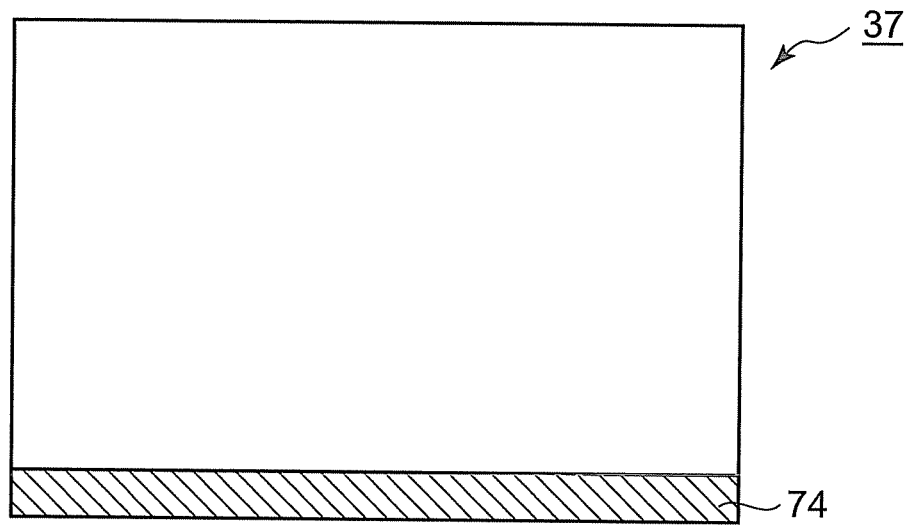
FIGS. 13A and 13B are explanatory drawings showing examples of the relations between the changes of the position angle of the display device of the client apparatus and the changes of the display position of the status bar.
Figure 13B:
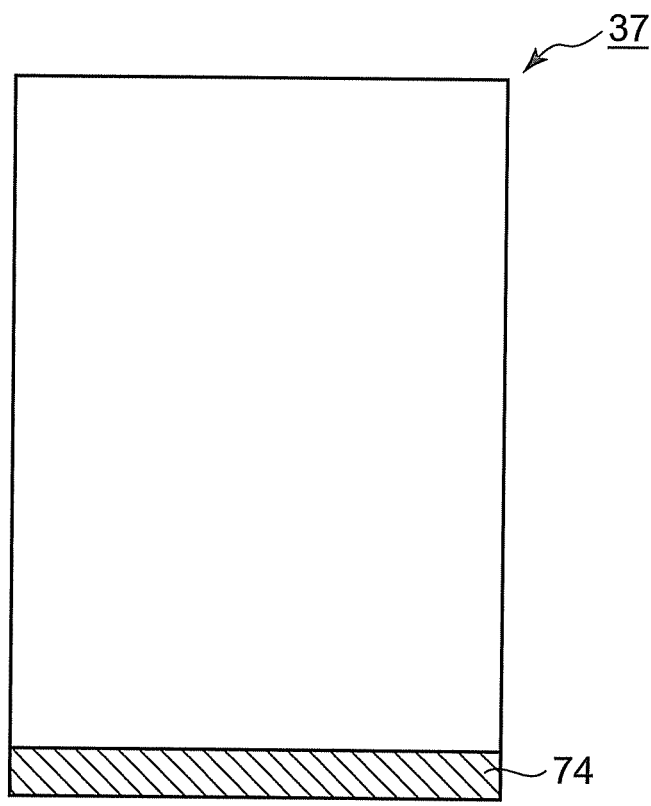

FIGS. 13A and 13B are explanatory drawings showing examples of the relations between the changes of the position angle of the display device 37 of the client apparatus 3 and the changes of the display position of the status bar 74. FIG. 13A is an explanatory drawing showing an example of displaying the status bar 74 so as to make one of the long sides of the status bar 74 abut against one of the long sides of the rectangular screen of the display device 37, and FIG. 13B is an explanatory drawing showing an example of displaying the status bar 74 so as to make one of the long sides of the status bar 74 abut against one of the short sides of the rectangular screen of the display device 37.

For example, the position angle of the client apparatus 3 may be adapted to be capable of being detected by providing a gyro sensor or the like to the client apparatus 3, and the control section 30 may be adapted to control the display position of the status bar 74 so as to make one of the long sides of the status bar 74 abut against one of the four sides constituting the rectangular screen of the display device 37 which one situated at a position nearest to the ground. The example shown in FIG. 13A is the case where one of the long sides of the rectangular screen of the display device 37 is situated at a position nearest to the ground among the four sides of the screen, and the example shown in FIG. 13B is the case where one of the short sides of the rectangular screen of the display device 37 is situated at a position nearest to the ground among the four sides of the screen.

The one of the four sides constituting the rectangular screen of the display device 37 which one is situated at the position nearest to the ground is generally situated at a lower part of the screen of the display device 37 as viewed from the point of view of a user. That is, the control of the display position of the status bar 74 so as to make one of the long sides of the status bar 74 abut against one of the four sides constituting the rectangular screen side which one is situated at a position nearest to the ground makes it possible to always display the status bar 74 at the position where the status bar 74 abuts against the lower side of the screen. Hereby, the status bar 74 can be displayed at a position where the status bar 74 is made to abut against the lower side of the screen of the display device 37 as viewed from the point of view of the user irrespective of the position angle of the client apparatus 3, and the sight line movement of a user can be made to be uniform when the user ascertains a change of the display contents of the status bar 71.

The display contents based on the screen data 51 are not limited to those in the whole display area of the display device 27 of the server apparatus 2, but the display contents may be those in a part of the display device 27 of the server apparatus 2. For example, the display contents may be those in one window display on the server apparatus 2 by the operation of a program subjected to the execution process in response to a request of a service of the client apparatus 3.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A client apparatus, which requests a service to a server apparatus and receives a result corresponding to the request from the server, the client apparatus comprising:
a communication device that receives screen data including a communication status bar and a position of a communication status bar area indicating a connection destination or progress of obtainment of resource in the screen data from the server;
a display device that displays contents of the screen data; and
a control section that detects a change of content of the communication status bar area in the screen data, causes the display device to display except for the status bar area based on the screen data when it is not detected that the content of the status bar area is changed, and causes the display device to display the status bar area produced by cutting out the position from the screen data when it is detected that the content of the status bar area is changed,
wherein the content of the communication status bar area includes a communication status indicating at least one of a connection destination and progress information of obtainment of resource between the server and a network-server.

2. The client apparatus according to claim 1, wherein the control section hides the communication status bar area displayed on the display device when it is not detected in a predetermined period that the content of the status bar area is changed.

3. The client apparatus according to claim 1, wherein the control section causes the display device to display a predetermined area of the communication status bar area.

4. The client apparatus according to claim 1, wherein the control section causes the display device to display the content of the communication status bar area when it is detected in a predetermined period that the contents of a predetermined area of the screen data except for the communication status bar area is changed.

5. The client apparatus according to claim 1, wherein the control section causes the display device to display a part of the communication status bar area the content of which is changed.

6. The client apparatus according to claim 1, wherein the control section causes the display device to display the content of the communication status bar area in a predetermined position.

7. The client apparatus according to claim 6, wherein the control section causes the display device to display the content of the communication status bar area based on a predetermined layout for the communication status bar area.

8. A computer system, comprising:
a client apparatus according to claim 1 and a server apparatus,
the server apparatus comprising:
a storage device that stores the screen data of a display screen of the server apparatus corresponding to the requested service;
a transmission section that obtains the position of the communication status bar area in the screen data and transmits the position of the communication status bar area to the client apparatus; and
a screen data transmission section that transmits the screen data to the client apparatus.

9. A non-transitory computer readable program storage medium which stores a program to be executed by a computer of a client apparatus for requesting a service to a server and receiving a result corresponding to the request from the server, the program comprising:
a receiving step for receiving screen data corresponding to the result of the request and a position of a communication status bar area indicating a connection destination or progress of obtainment of resource in the screen data from the server;
a display step for displaying the screen data on a display section; and
a control step for detecting a change of content of the communication status bar area so as to display the screen data except for the communication status bar area on the display section when it is not detected that the content of the communication status bar area is changed, and display the content of the communication status bar area by cutting out the position from the screen data when it is detected that the content of the communication status bar area is changed, wherein the content of the communication status bar area is a communication status between the server and a network-server.

10. A display method to be executed by a computer of a client apparatus that requests a service to a server and receives a result corresponding to the request from the server, the method comprising:
receiving screen data corresponding to the result of the request and a position of the communication status bar area in the screen data from the server;
displaying contents of the screen data on a display section; and
controlling so as to detect a change of content of the communication status bar area, display except for the communication status bar area based on the screen data on the display section when it is not detected that the content of the communication status bar area is changed and display the content of the communication status bar area on the display section by cutting out the position from the screen data when it is detected that the content of the communication status bar area is changed, wherein the content of the communication status bar area is a communication status between the server and a network-server.

11. The display method according to claim 10, wherein the controlling hides the communication status bar area displayed on the display section when it is not detected in a predetermined period that the content of the communication status bar area is changed.

12. The display method according to claim 10, wherein the controlling causes the display section to display a predetermined area of the communication status bar area.

13. The display method according to claim 10, wherein the controlling causes the display section to display the content in the communication status bar area when it is detected in a predetermined period that the contents of a predetermined area of the screen data except for the communication status bar area is changed.

14. The display method according to claim 10, wherein the controlling causes the display section to display a part of the communication status bar area the content of which is changed.

15. The display method according to claim 10, wherein the controlling causes the display section to display the content of the communication status bar area in a predetermined position.

16. The display method according to claim 15, wherein the controlling causes the display section to display the content of the communication status bar area based on a predetermined layout for the communication status bar area.

17. A client apparatus, which requests a service to a server apparatus and receives a result corresponding to the request from the server, the client apparatus comprising:
- a communication means for receiving screen data including a communication status bar and a position of the communication status bar area indicating a connection destination or progress of obtainment of resource in the screen data from the server;
- a display means for displaying contents of the screen data; and
- a control means detecting a change of content of the communication status bar area in the screen data, causes the display means to display except for the status bar area based on the screen data when it is not detected that the content of the status bar area is changed, and causes the display means to display the status bar area produced by cutting out the position from the screen data when it is detected that the content of the status bar area is changed,
- wherein the content of the communication status bar area includes a communication status indicating at least one of a connection destination and progress information of obtainment resource between the server and a network-server.

* * * * *